United States Patent
Namiki et al.

(10) Patent No.: US 7,986,855 B2
(45) Date of Patent: Jul. 26, 2011

(54) BLOCK NOISE DETECTOR AND DETECTION METHOD, AND BLOCK NOISE REDUCER AND REDUCTION METHOD

(75) Inventors: Ryosuke Namiki, Tokyo (JP); Akihiro Nagase, Tokyo (JP); Hideki Yoshii, Tokyo (JP); Shuichi Kagawa, Tokyo (JP); Jun Someya, Tokyo (JP); Hiroaki Sugiura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 833 days.

(21) Appl. No.: 12/071,028

(22) Filed: Feb. 14, 2008

(65) Prior Publication Data

US 2008/0199102 A1    Aug. 21, 2008

(30) Foreign Application Priority Data

Feb. 16, 2007   (JP) ................................. 2007-036002
Jun. 29, 2007   (JP) ................................. 2007-172062

(51) Int. Cl.
  *G06K 9/40* (2006.01)
  *H04N 1/407* (2006.01)
  *H04B 14/04* (2006.01)

(52) U.S. Cl. ..................... 382/275; 358/3.27; 375/254

(58) Field of Classification Search .............. 382/218, 382/254, 266–275, 286, 300, 305, 312; 358/3.26, 358/3.27, 463; 348/466, 495, 500, 540, 607; 375/240.27, 254; 345/611

See application file for complete search history.

(56) References Cited

U.S. PATENT DOCUMENTS

| | | | | |
|---|---|---|---|---|
| 5,210,516 A | * | 5/1993 | Shikama et al. | 338/22 R |
| 6,738,528 B1 | * | 5/2004 | Nio et al. | 382/268 |
| 7,397,457 B2 | * | 7/2008 | Sugino et al. | 345/89 |
| 7,538,824 B1 | * | 5/2009 | Pillay et al. | 348/701 |
| 7,668,392 B2 | * | 2/2010 | Yamada et al. | 382/268 |

FOREIGN PATENT DOCUMENTS

WO   WO-2005/004489 A1   1/2005

* cited by examiner

*Primary Examiner* — Kanji Patel
(74) *Attorney, Agent, or Firm* — Birch, Stewart, Kolasch & Birch, LLP

(57) ABSTRACT

A block noise detector has a spatial difference calculator that calculates differences between values of adjacent pixels. A spatial difference comparator detects edges by comparing the calculated differences. Eight counters count edges detected at different groups of positions spaced eight pixels apart in each horizontal line. The maximum count and the group of positions at which it occurs are detected at the end of each horizontal line to detect block noise and the positions of the block boundaries. The block noise detector is small in size because it only has to count edges in one line at a time, and detects edges accurately by comparing the difference at a given position separately with differences to the left and differences to the right.

18 Claims, 21 Drawing Sheets

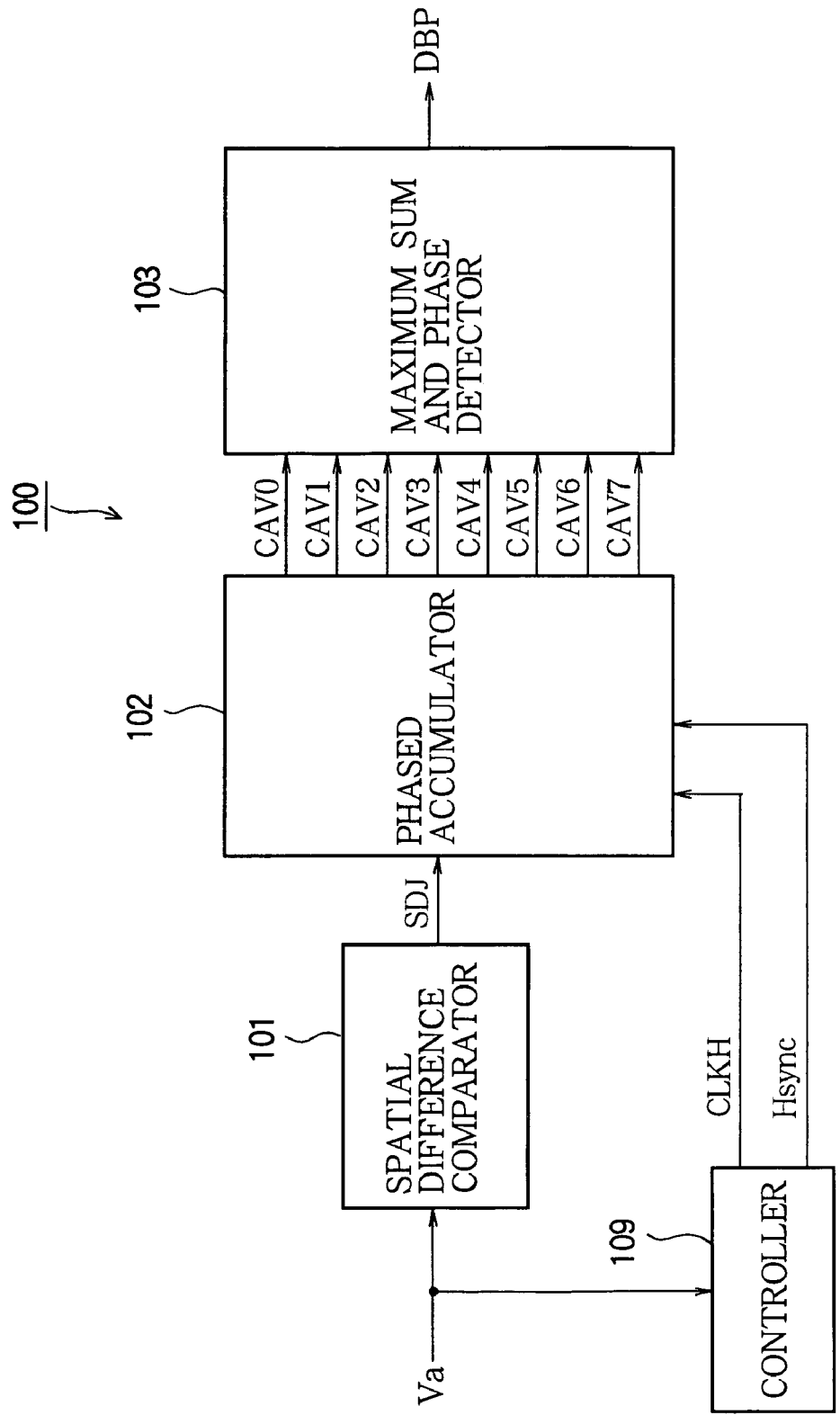

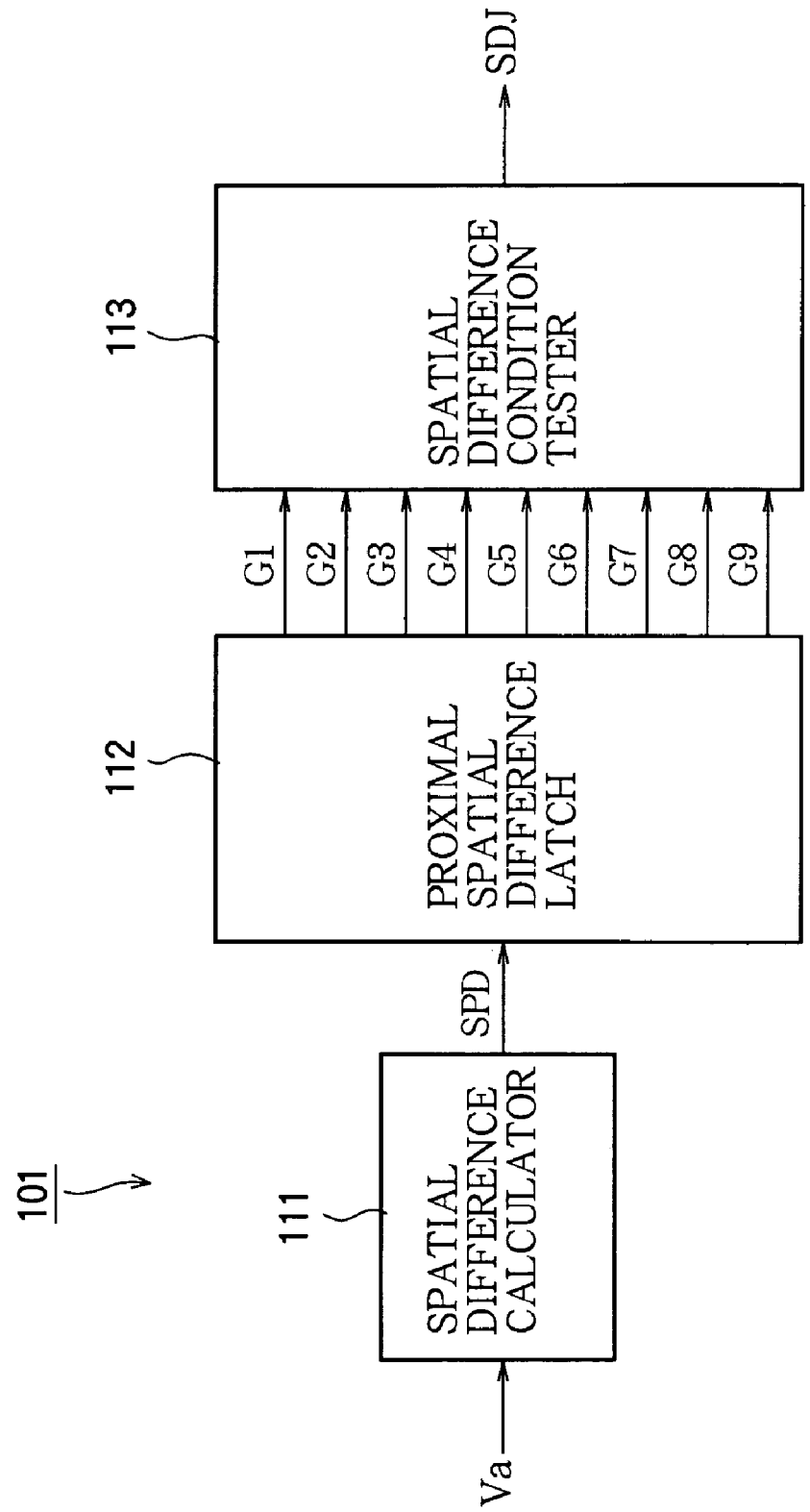

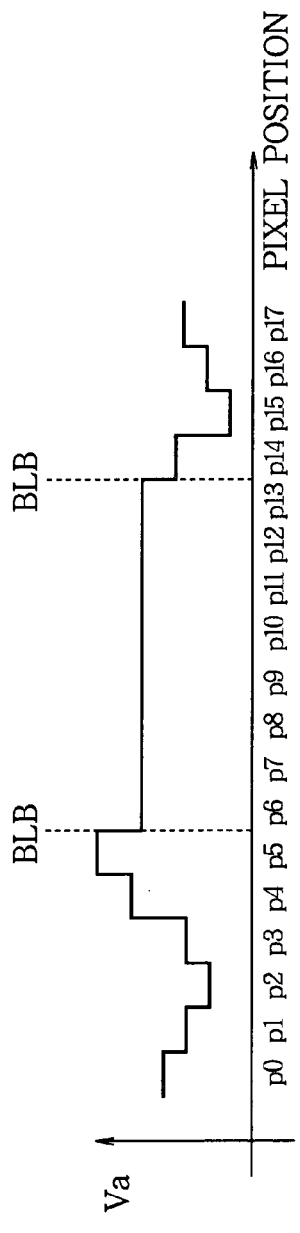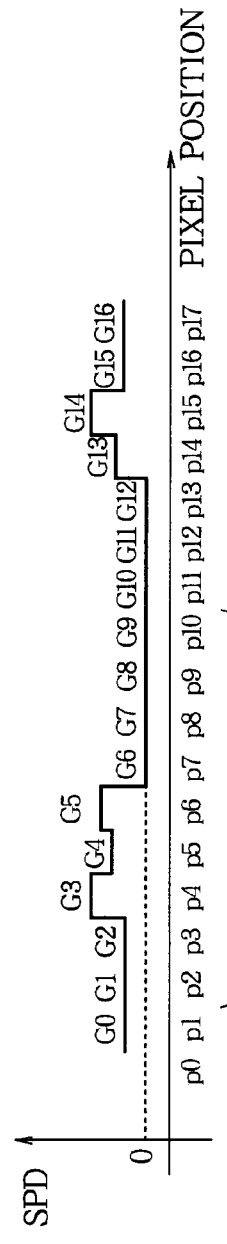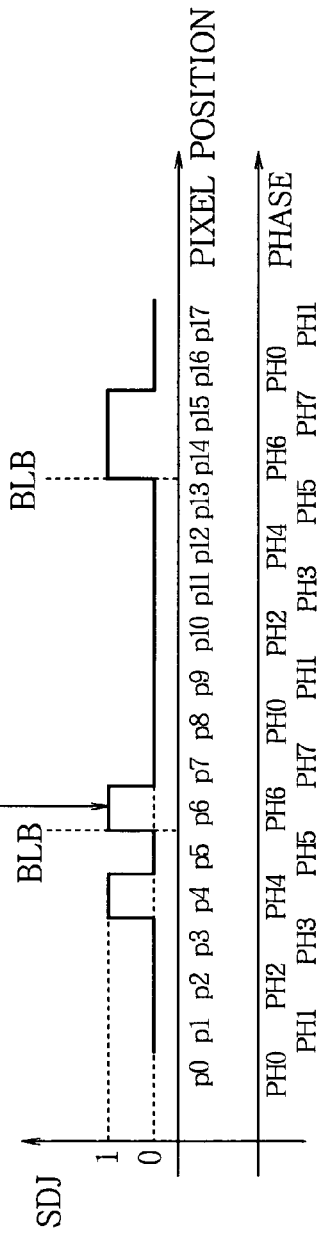
FIG.4A
FIG.4B
FIG.4C

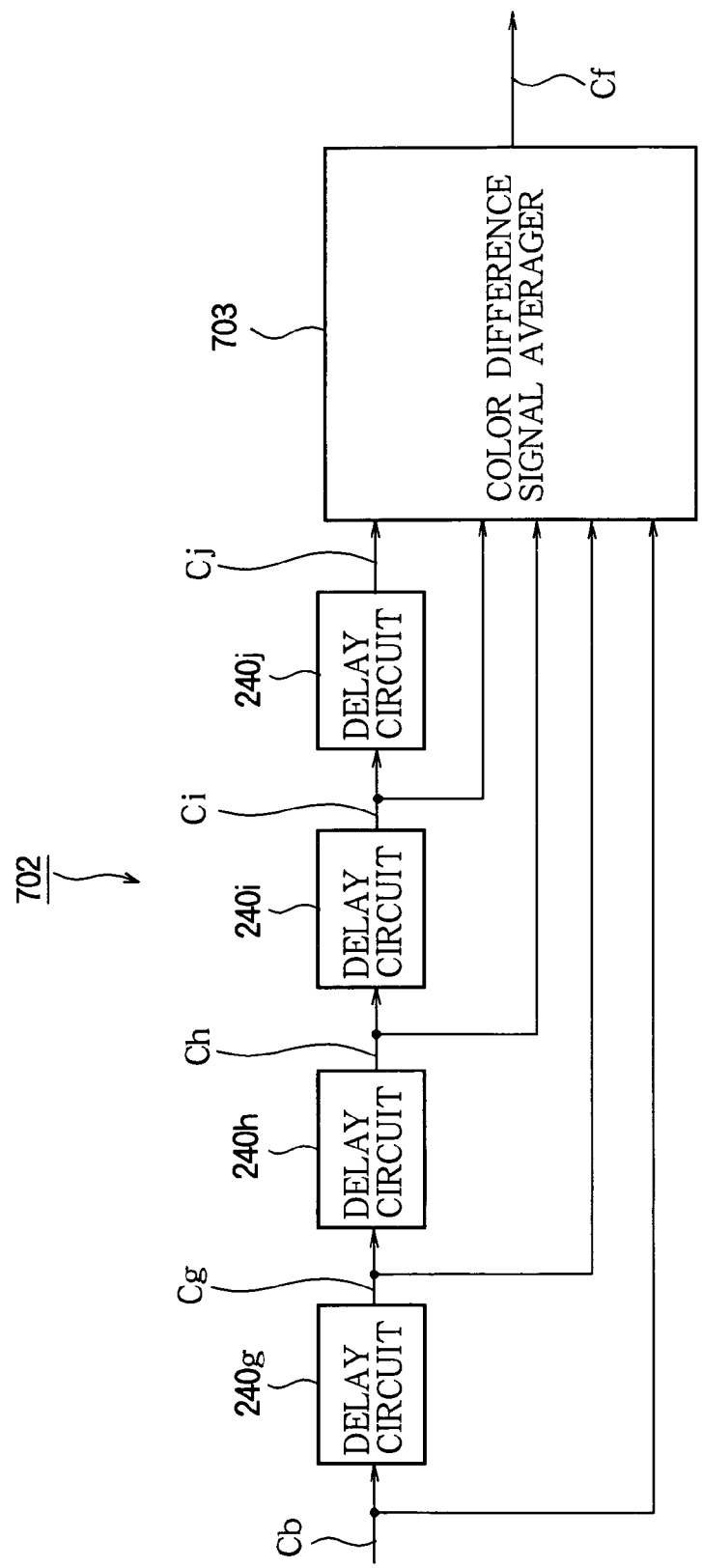

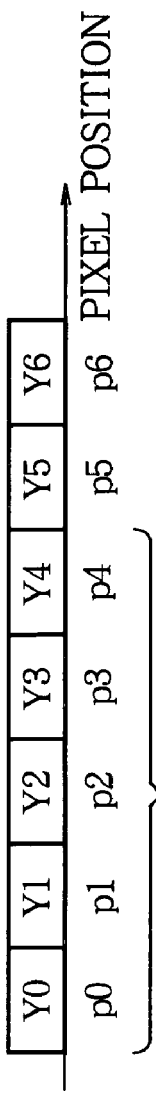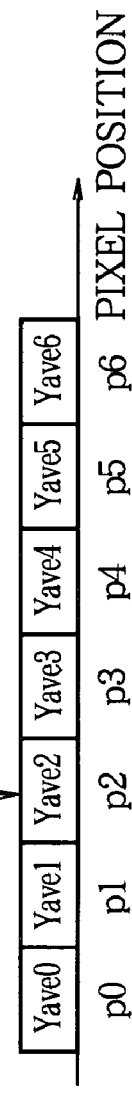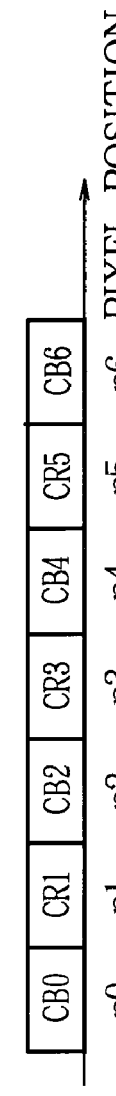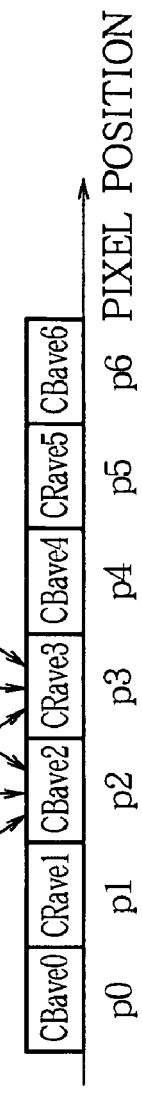

BLOCK NOISE DETECTOR AND DETECTION METHOD, AND BLOCK NOISE REDUCER AND REDUCTION METHOD

BACKGROUND OF THE INVENTION

1. Field of the Invention

The present invention relates to video signal processing, more particularly to the detection and reduction of the block noise that often occurs when a digital video signal is transmitted or recorded in a compressed form.

2. Description of the Related Art

Commonly used video data compression algorithms operate on 8×8 blocks of picture elements (pixels). Block noise (also called block distortion) occurs when processing discontinuities at the block boundaries make the blocks visible in the decompressed video picture. Detecting block noise and reducing it by appropriate filtering is a known art.

One known block noise detector, disclosed in PCT Patent Application Publication No. WO2005-004489, employs an edge detector, an edge counter, and a boundary identifier. The edge detector recognizes an edge when the luminance change at a point exceeds the average luminance change at nearby points to the right and left, multiplied by a coefficient. The edge counter has a plurality of counters that count edges detected at different horizontal positions. The boundary identifier receives the edge counts at the end of each video field or frame, at a timing controlled by the vertical synchronizing signal, and detects block noise and the positions of the block boundaries from the occurrence of particularly high counts at intervals of eight picture elements. (See lines 4 to 11 on page 6 of the Japanese PCT publication, and FIGS. 1 to 3).

One problem with this known block noise detector is that it can fail to detect edges at which there is significant luminance variation one side of the edge but not on the other side.

Another problem is that large counters are needed to count edges over an entire video field or frame, and wide data paths are needed to process the resulting counts, making the block noise detector circuit large in size. A related problem is that a large memory is needed to store the video signal for one field or frame awaiting block noise detection, since noise reduction cannot begin until the block boundaries have been detected. A block noise reducer employing this block noise detector therefore has a very large circuit size.

SUMMARY OF THE INVENTION

An object of the present invention is to reduce the circuit size of a block noise detector and a block noise reducer.

Another object of the invention is to improve the accuracy of a block noise detector by detecting block boundaries even when large signal variations occur on one side of the boundary.

A block noise detector according to the invention receives an input video signal including pixel values and a horizontal synchronizing signal, and detects block boundaries due to block noise.

In the block noise detector, a spatial difference calculator calculates differences between values of adjacent pixels and outputs them as spatial differences.

A spatial difference comparator detects edges by comparing the calculated spatial differences and outputs a decision signal indicating, for each calculated spatial difference, whether an edge is detected at the corresponding position.

A phased accumulator uses a plurality of counters, which receive the decision signal cyclically, to count edges detected at different phases in the receiving cycle, and outputs the resulting count values at a timing synchronized with the horizontal synchronizing signal.

A maximum sum and phase detector outputs a maximum value signal having a maximum value among the count values output by the counters at this timing, and a maximum phase signal indicating the phase at which the maximum value occurs.

The block noise detector outputs a detected block phase signal indicating a detected block phase at which block boundaries are detected. The detected block phase signal is based on the maximum phase signal.

The counters are reset each time their contents are output in synchronization with the horizontal synchronizing signal. Accordingly, comparatively small counters suffice, reducing the circuit size of the block noise detector.

A block noise reducer incorporating this block noise detector only has to store one horizontal line of the input video signal, instead of an entire field or frame, so the circuit size of the block noise reducer is further reduced.

In edge detection at a position corresponding to a spatial difference are detected, the spatial difference comparator may compare the spatial difference separately with neighboring spatial differences to the left and neighboring spatial differences to the right, and an edge may be detected if a predetermined condition is satisfied with respect to either the neighboring spatial differences to the left or the neighboring spatial differences to the right. Edges can then be detected even at points at which the input video signal varies significantly on one side of the edge. Block boundaries can accordingly be detected more accurately then by the conventional averaging scheme.

BRIEF DESCRIPTION OF THE DRAWINGS

In the attached drawings:

FIG. 1 is a block diagram of a block noise detector according to a first embodiment of the invention;

FIG. 2 is a block diagram of the spatial difference comparator in the block noise detector;

FIGS. 3A to 3C and 4A to 4C are timing diagrams illustrating the operation of the spatial difference comparator;

FIG. 20 is a block diagram showing an example of the smoothing processor in FIG. 19;

FIGS. 21A to 21D illustrate the operation of the smoothers in FIG. 18; and

DETAILED DESCRIPTION OF THE INVENTION

Figures 3A, 3B, 3C:
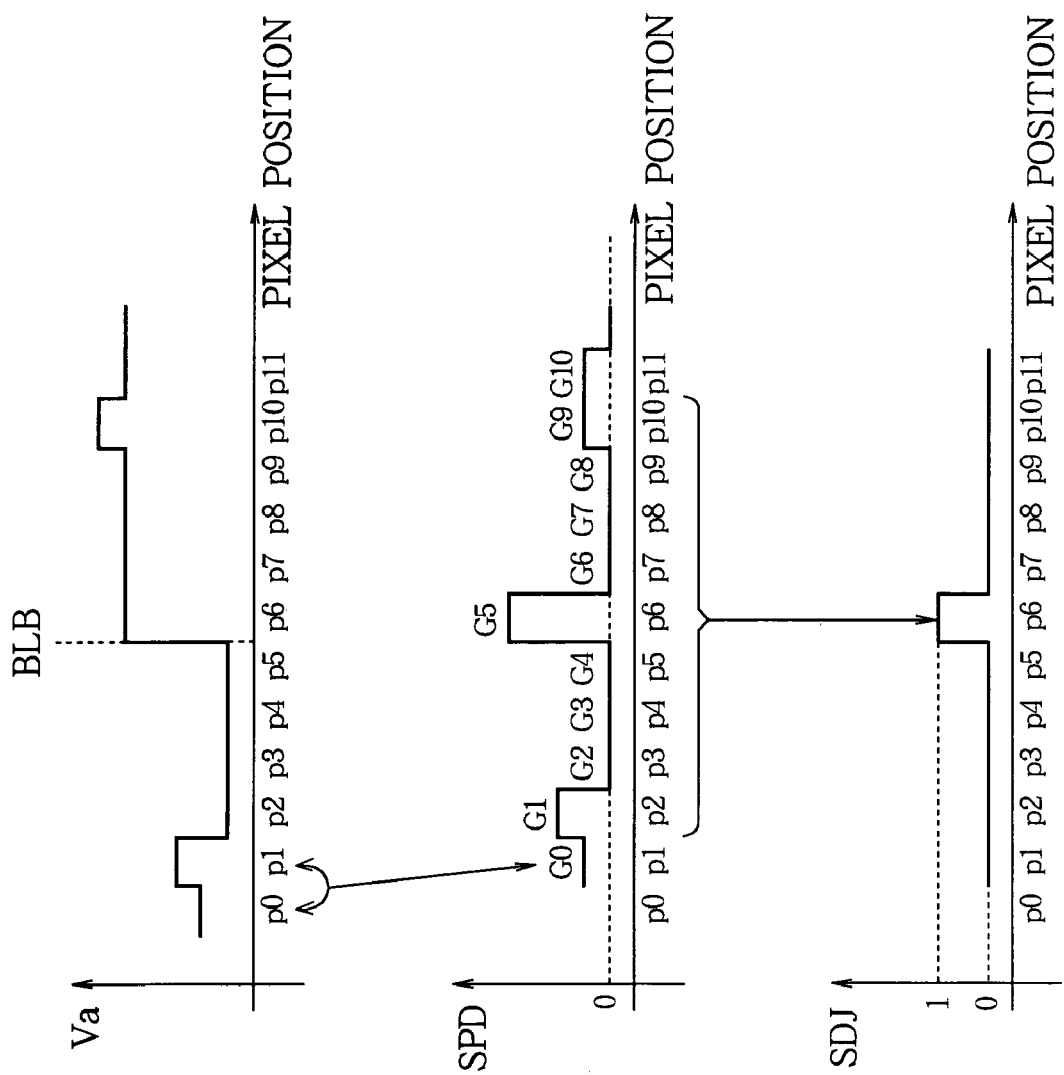

Embodiments of the invention will now be described with reference to the attached drawings, in which like elements are indicated by like reference characters. The embodiments detect block noise and block boundaries in a video signal that has been compressed and decompressed by a coding method that operates on blocks eight pixels wide.

First Embodiment

Referring to FIG. 1, the block noise detector 100 in the first embodiment comprises a spatial difference comparator 101, a phased accumulator 102, a maximum sum and phase detector 103, and a controller 109.

A monochrome input video signal Va is supplied to the spatial difference comparator 101 and the controller 109. The controller 109 extracts a horizontal synchronizing signal Hsync from the input video signal Va, generates a pixel clock signal CLKH with a period equal to the pixel sampling period, synchronized to the horizontal synchronizing signal Hysnc, and supplies CLKH and Hsync to the phased accumulator 102.

The controller 109 also extracts a vertical synchronizing signal Vsync, which is used together with the horizontal synchronizing signal to control the spatial difference comparator 101 and maximum sum and phase detector 103. A detailed description of the vertical synchronization operations will be omitted.

The spatial difference comparator 101 calculates differences between the values of adjacent pixels in the input video signal Va, outputs the calculated differences as spatial differences, detects edges by comparing the calculated spatial differences, and outputs the result to the phased accumulator 102 as a decision signal SDJ indicating, for each calculated spatial difference, whether an edge is detected at the corresponding position.

The phased accumulator 102 includes eight counters that cyclically receive the decision signal SDJ, count edges detected at the eight different phases in the receiving cycle (the length of the receiving cycle is eight pixel clock periods, equivalent to the horizontal block width), and generate results for one line of pixels as eight count values CAV0 to CAV7 corresponding to the eight different phases. These count values are supplied to the maximum sum and phase detector 103 at a timing synchronized with the horizontal synchronizing signal Hsync extracted from the input video signal Va.

For each line of pixels, the maximum sum and phase detector 103 generates a maximum value or maximum sum signal MAS having a maximum value among the eight count values CAV0 to CAV7 output by the counters at the above timing, and a maximum phase signal MAP indicating the phase at which the maximum value occurs. The maximum phase signal MAP is also used as a detected block phase signal DBP in this embodiment.

An example of the spatial difference comparator 101 in the block noise detector 100 is shown in FIG. 2. The spatial difference comparator 101 comprises a spatial difference calculator 111, a proximal spatial difference latch 112, and a spatial difference condition tester 113.

The spatial difference calculator 111 calculates the absolute differences between the values of adjacent pixels in the input video signal Va, and outputs the absolute differences as a spatial difference signal SPD to the proximal spatial difference latch 112. If, for example, the spatial difference calculator 111 receives an input video signal Va in which a block boundary BLB occurs as shown in FIG. 3A, it calculates the absolute value G0 of the difference between the values of adjacent pixels p0 and p1 as shown in FIG. 3B, and outputs the calculated difference as a spatial difference. The spatial difference calculator 111 similarly calculates the absolute values G1 to G10 of the differences between the values of other pairs of adjacent pixels p1 to p11.

As the input video signal Va is monochrome, the pixel values in FIG. 3A are gray-scale values.

The proximal spatial difference latch 112 holds the received spatial difference signal SPD in a plurality of flip-flop circuits, and outputs the nine most recently received adjacent spatial differences, numbered G1 to G9 in FIG. 3B, to the spatial difference condition tester 113.

When the spatial difference condition tester 113 receives these nine adjacent spatial differences G1 to G9, if the fifth spatial difference G5 is the greatest among the first to fifth spatial differences G1 to G5, or among the fifth to ninth spatial difference G5 to G9, the spatial difference condition tester 113 outputs a decision signal SDJ with the value '1'. If neither condition is satisfied, the spatial difference condition tester 113 outputs the decision signal SDJ with the value '0'. In FIG. 3B the spatial differences G1 to G9 satisfy both conditions, which are given by inequalities (1) and (2) below, so the spatial difference condition tester 113 outputs the value '1' as a decision signal SDJ for pixel p6, as shown in FIG. 3C.

$$G5 > \text{MAX}(G1, G2, G3, G4) \qquad (1)$$

$$G5 > \text{MAX}(G6, G7, G8, G9) \qquad (2)$$

Inequality (1) means that spatial difference G5 is greater than the maximum of the four left-neighboring spatial differences G1-G4; that is, G5 is greater than all of the left-neighboring spatial differences G1-G4. Similarly, inequality (2) means that G5 is greater than all of the right-neighboring spatial differences G6-G9.

If the spatial difference calculator 111 receives an input video signal Va in which block boundaries BLB occur as shown in FIG. 4A, the spatial difference calculator 111 outputs the spatial difference signal SPD as shown in FIG. 4B, and the spatial difference condition tester 113 outputs the decision signal SDJ as shown in FIG. 4C. At pixel p6 (phase PH6), the spatial differences in FIG. 4B do not satisfy condition (1) but they satisfy condition (2), so the value of the decision signal SDJ is '1' as shown in FIG. 4C. At pixel p14 (phase PH6), the spatial differences do not satisfy condition (2) but they satisfy condition (1), so the value of the decision signal SDJ is again '1' as shown in FIG. 4C.

The decision signal SDJ in FIG. 4C is also '1' in pixel positions p4 (phase PH4) and p15 (phase PH7), where block boundaries BLB do not occur. The decision signal SDJ is always '1' in the pixel positions at phase PH6, however, whereas the decision signal SDJ is sometimes '1' but more often '0' in pixel positions at the phases other than phase PH6. Accordingly, among the eight count values CAV0 to CAV7, the maximum count value output by the phased accumulator 102 is the count value CAV6 corresponding to the phase PH6 at which the block boundaries BLB occur.

Figure 5:
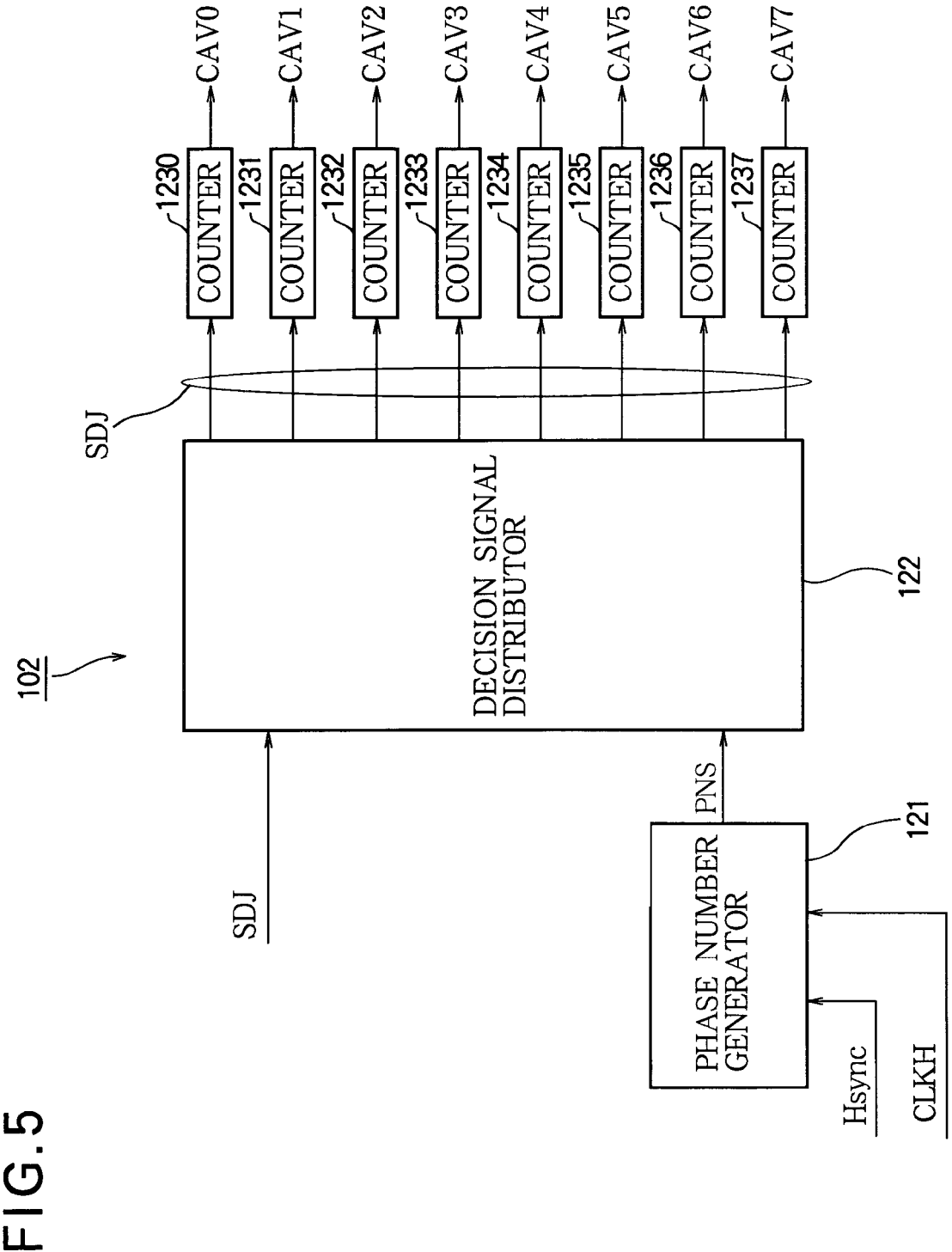
FIG. 5 is a block diagram of the phased accumulator in the block noise detector.

An example of the phased accumulator 102 in the block noise detector 100 is shown in FIG. 5. The phased accumulator 102 comprises a phase number generator 121, a decision signal distributor 122, and eight counters 1230-1237.

The phase number generator 121 operates in synchronization with the horizontal synchronizing signal Hsync, detects phases by counting pixel clock (CLKH) cycles, and outputs a phase number signal PNS with phase values from PH0 to PH7 to the decision signal distributor 122 to identify the phases.

For example, the phase number generator 121 may set a particular phase, such as phase PH0, when it receives the horizontal synchronizing signal Hsync, and then increment the phase value (number) by one at each cycle of the pixel clock CLKH. When the phase number reaches the maximum value PH7, the phase number generator 121 resets the phase number at the initial value PH0 and then repeats the same process.

The decision signal distributor 122 routes the input decision signal SDJ to different counters 1230-1237 according to the phase indicated by the input phase number signals PNS. More specifically, if a phase number signal PNS indicates a certain phase PHn, n being a positive integer equal to or greater than zero and equal to or less than seven ($0 \leq n \leq 7$), the decision signal distributor 122 outputs the decision signal SDJ received at phase PHn to the corresponding counter 123n.

Figure 6:
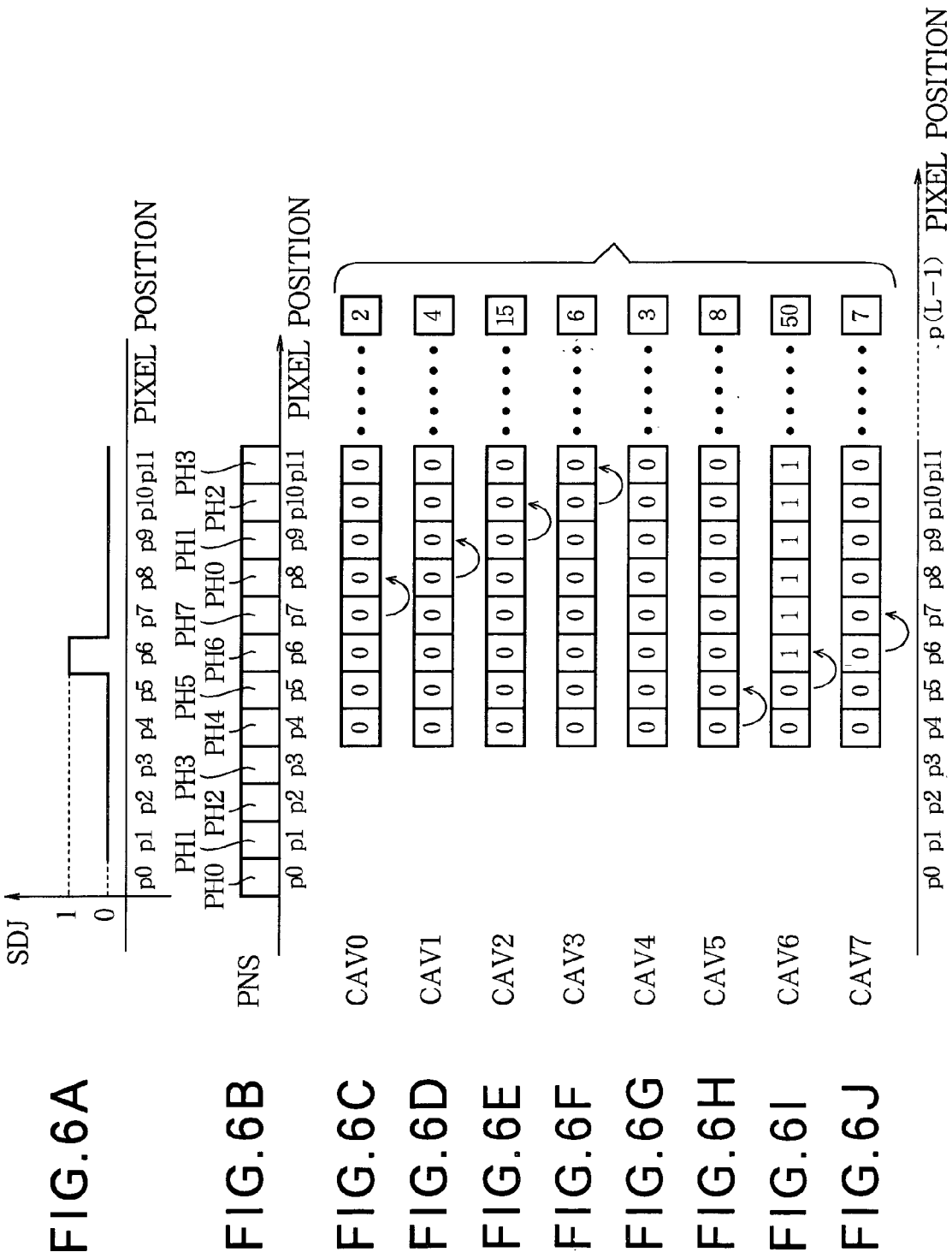
FIGS. 6A to 6J illustrate the operation of the phased accumulator.

If, for example, the decision signal distributor 122 receives the decision signal SDJ shown in FIG. 6A and the phase number signals PNS shown in FIG. 6B, at pixel position p6, since the decision signal SDJ is '1' and the phase number signal PNS indicates phase PH6, the decision signal distributor 122 outputs the '1' value of the decision signal SDJ to the counter 1236 that produces count value CAV6, as shown in FIG. 6I.

Counters 1230-1237 receive the decision signal SDJ through the decision signal distributor 122, count the input values, and output count values CAV0 to CAV7 for one line at a timing synchronized with the horizontal synchronizing signal Hsync.

If, for example, one line has L pixels, L being a positive integer, the counters 1230-1237 output the count values CAV0 to CAV7 reached at the (L−1)th pixel position p(L−1) as shown in FIGS. 6C to 6J.

Figure 7:
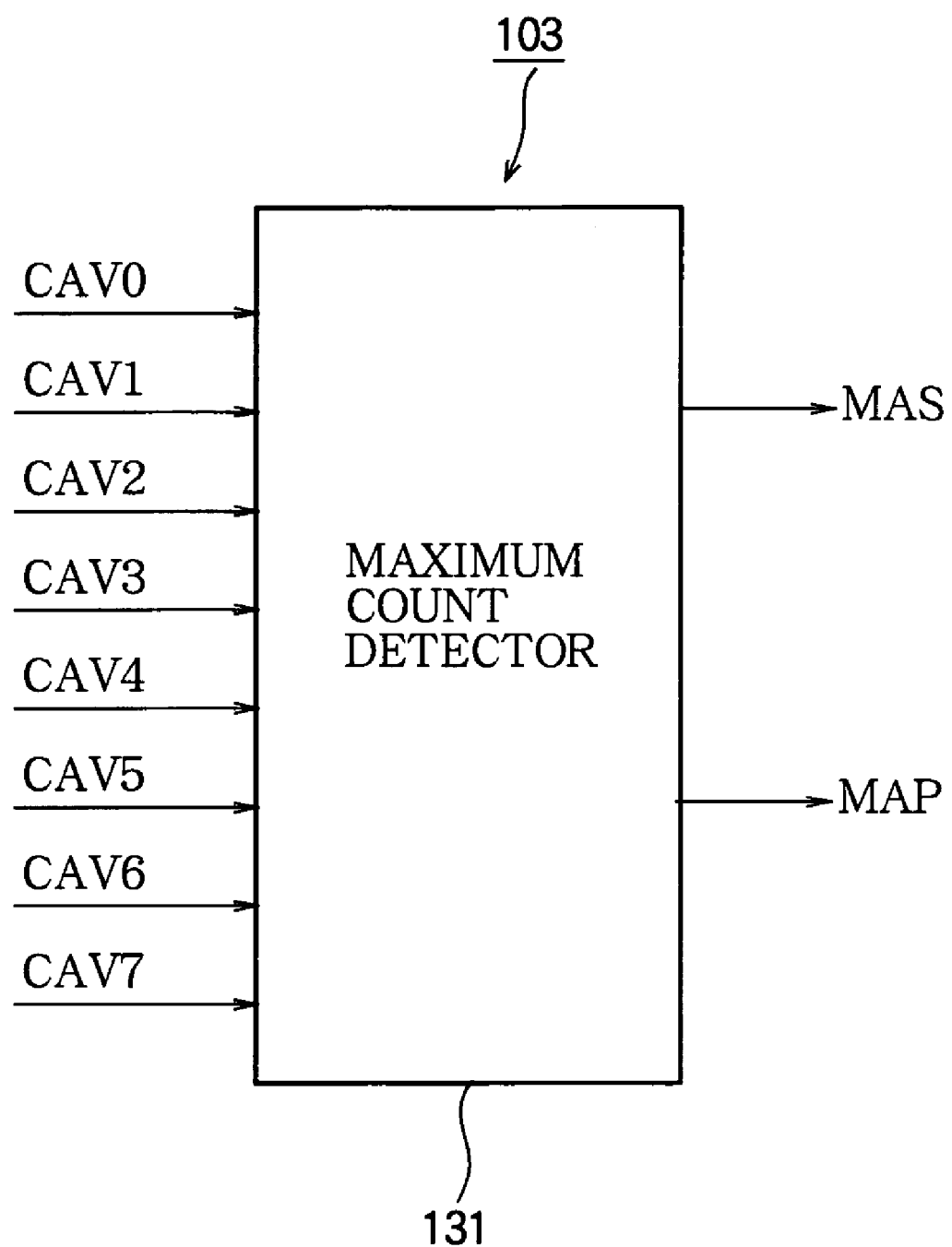
FIG. 7 is a block diagram of the maximum sum and phase detector in the block noise detector.

An example of the maximum sum and phase detector 103 in the block noise detector 100 is shown in FIG. 7. The maximum sum and phase detector 103 includes a maximum count detector 131.

For each line, the maximum count detector 131 compares the eight input count values CAV0 to CAV7, outputs a maximum value signal MAS having the maximum value CAVm among the eight count values, and outputs a maximum phase signal MAP indicating the phase PHm at which the maximum value CAVm occurs. In the first embodiment, the maximum count detector 131 also outputs the maximum phase signal MAP as the detected block phase signal DBP.

Figure 8:
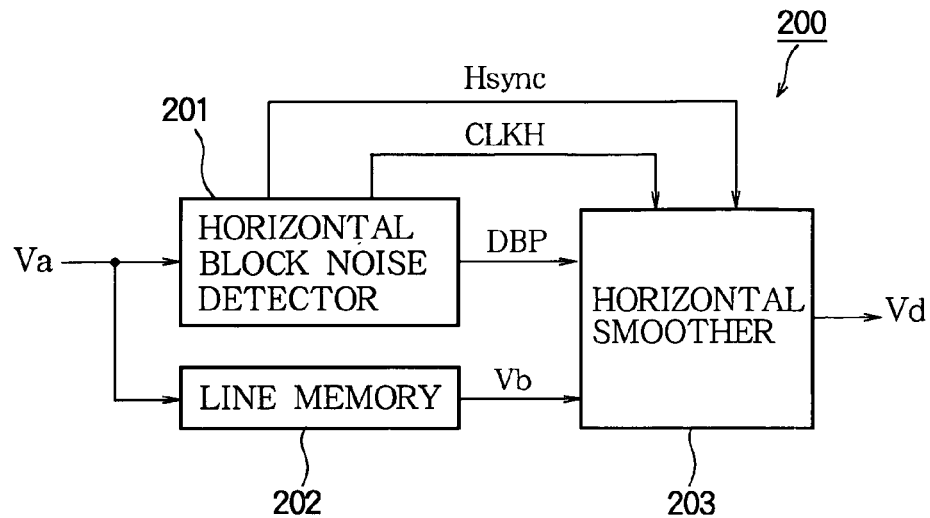
FIG. 8 is a block diagram of a block noise reducer including the block noise detector in the first embodiment.

Referring to FIG. 8, a block noise reducer 200 using the block noise detector 100 in the first embodiment comprises a horizontal block noise detector 201, a line memory 202, and a horizontal smoother 203.

The horizontal block noise detector 201 has the same structure as the block noise detector 100 in FIG. 1. The horizontal block noise detector 201 receives the input video signal Va and outputs the detected block phase signal DBP to the horizontal smoother 203.

The line memory 202 holds the input video signal Va for one horizontal line, thereby delaying the video signal Va by one horizontal line, and outputs the delayed signal as an input video signal Vb to the horizontal smoother 203.

The horizontal smoother 203 smoothes the input video signal Vb in a continuous range of phases including the phase identified by the detected block phase signal DBP in the current line to generate a partially smoothed output video signal Vd.

Figure 9:
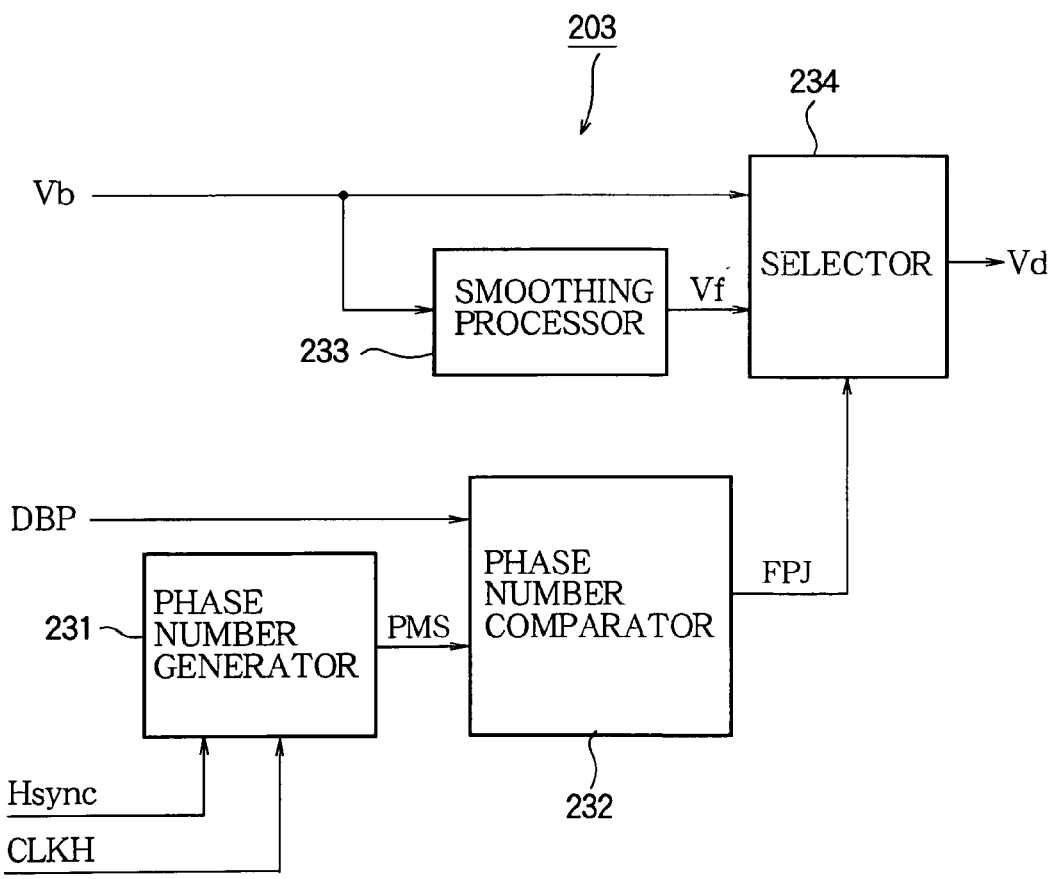
FIG. 9 is a block diagram of the horizontal smoother in the block noise reducer.

An example of the internal structure of the horizontal smoother 203 in the block noise reducer 200 is shown in FIG. 9. The horizontal smoother 203 in this example comprises a phase number generator 231, a phase number comparator 232, a smoothing processor 233, and a selector 234.

The phase number generator 231 has the same structure as the phase number generator 121 shown in FIG. 5. The phase number generator 231 receives the horizontal synchronizing signal Hsync and pixel clock signal CLKH output from the controller 109 in the horizontal block noise detector 201, operates in synchronization with the horizontal synchronizing signal Hsync, detects phases by counting pixel clock (CLKH) cycles, and outputs a phase number signal PMS with phase values from PH0 to PH7 to the phase number comparator 232 to identify phases.

The phase number comparator 232 compares the input phase number signal PMS with the input detected block phase signal DBP, and outputs a four-phase range decision signal FPJ to the selector 234 according to the result. If the detected block phase signal DBP indicates a certain phase PHn, n being a positive integer equal to or greater than zero and equal to or less than seven ($0 \leq n \leq 7$), and the phase number signal PMS indicates phase PH(n−2), PH(n−1), PHn, or PH(n+1), modulo eight, the range decision signal FPJ has the value '1'. If this condition is not satisfied, the range decision signal FPJ has the value '0'.

Figure 10A:
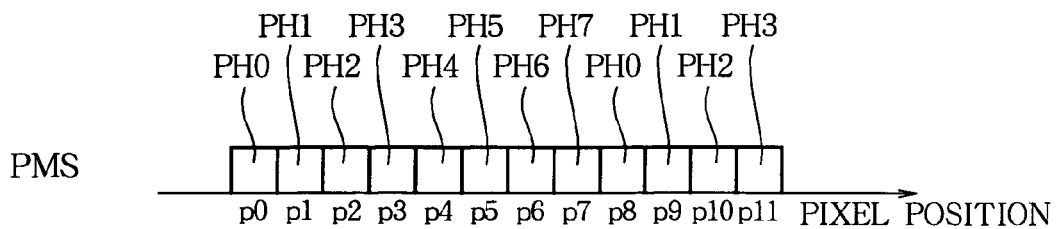
FIGS. 10A to 10E are timing diagrams illustrating the operation of the horizontal smoother.

If, for example, the phase number comparator 232 receives the phase number signal PMS as shown in FIG. 10A and the detected block phase signal DBP indicates phase PH6 (n=6), since the phase values indicated by the phase number signal PMS at pixel positions p4 to p7 are PH4 to PH7, which are equal to PH(n−2), PH(n−1), PHn, and PH(n+1), the phase number comparator 232 gives the range decision signal FPJ the value '1' at pixel positions. p4 to p7, and the value '0' at pixel positions other than pixel positions p4 to p7.

More generally, the phase number comparator 232 outputs a range decision signal FPJ having one value in a continuous range of phases including the detected block phase, at least one phase preceding the detected block phase, and at least one phase following the detected block phase, and having another value at phases outside this continuous range.

The smoothing processor 233 smoothes the input video signal Vb to generate a smoothed signal Vf, and outputs the smoothed signal Vf to the selector 234.

Figure 10B:
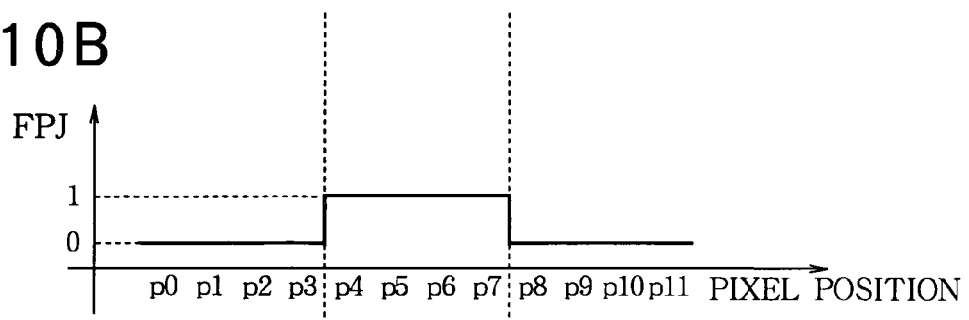
Figure 10C:
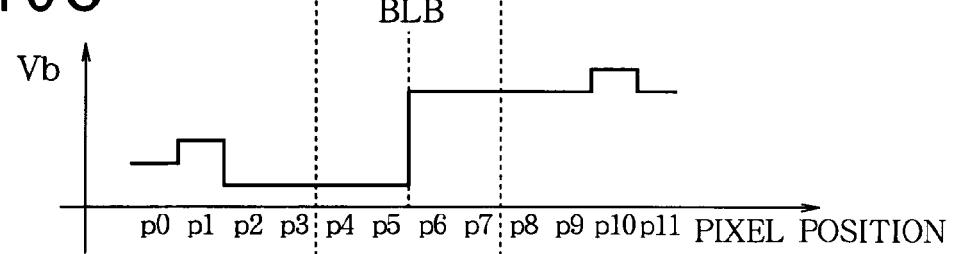
Figure 10D:
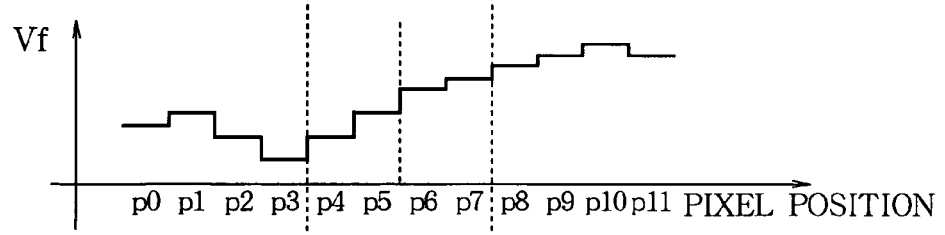

If, for example, the smoothing processor 233 receives an input video signal Vb in which a block boundary BLB occurs as shown in FIG. 10C, the smoothing processor 233 smoothes the input video signal Vb and outputs the smoothed signal Vf as shown in FIG. 10D.

Figure 11:
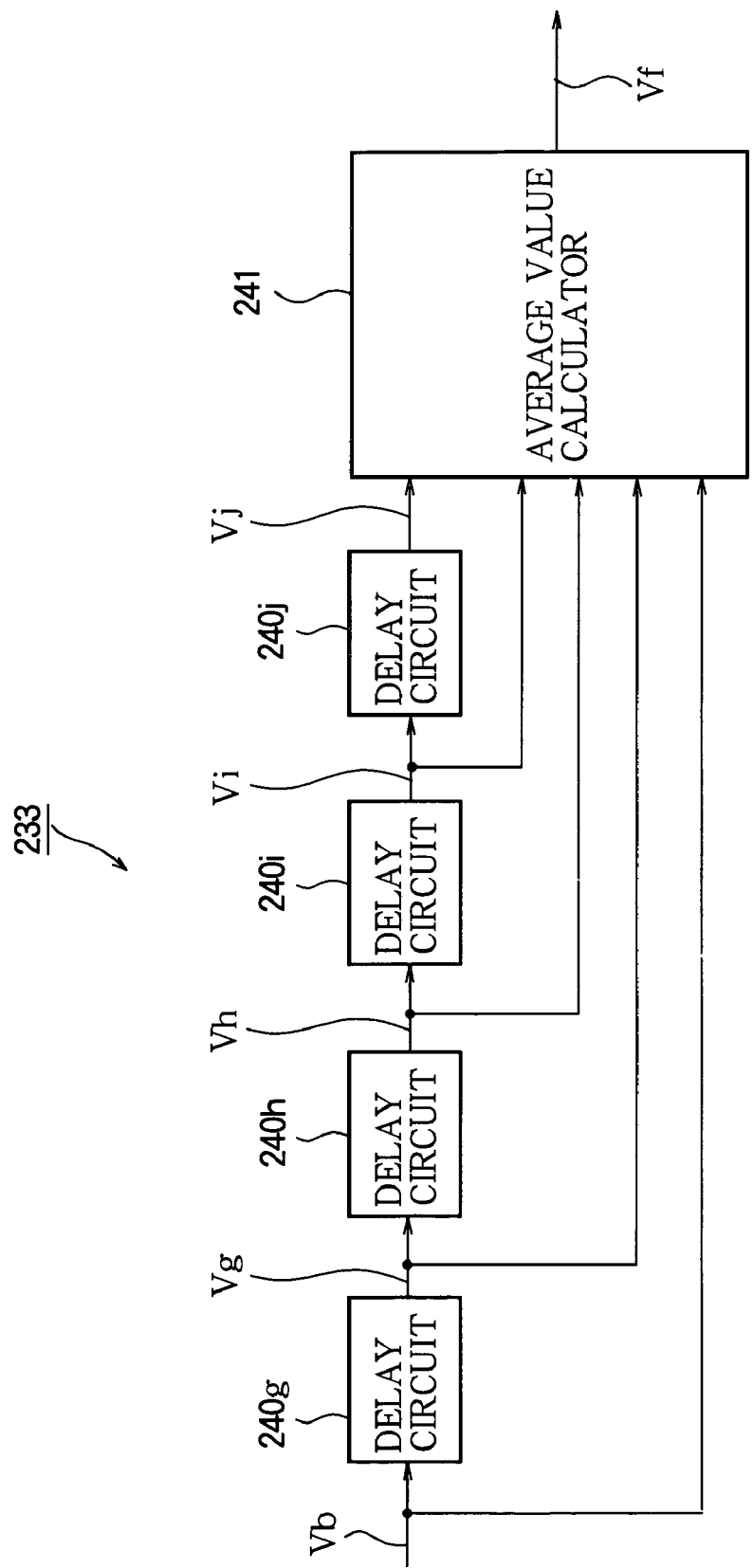
FIG. 11 is a block diagram showing an example of the smoothing processor in FIG. 9.

An example of the internal structure of the smoothing processor 233 is shown in FIG. 11. The smoothing processor 233 in this example includes delay circuits 240g, 240h, 240i, and 240j and an average value calculator 241.

Delay circuit 240g receives the input video signal Vb, delays the input video signal Vb by one pixel sampling period (one pixel clock period), and outputs it as an input video signal Vg to delay circuit 240h. Similarly, delay circuit 240h delays input video signal Vg by one pixel sampling period and outputs it as an input video signal Vh to delay circuit 240i; delay circuit 240i delays input video signal Vh by one pixel sampling period and outputs it as an input video signal Vi to delay circuit 240j; and delay circuit 240j delays input video signal Vi by one pixel sampling period and outputs it as an input video signal Vj to the average value calculator 241.

The average value calculator 241 receives these five input video signals Vb, Vg, Vh, Vi, and Vj, calculates their average value, and outputs it as the smoothed signal Vf. The average value may be a simple average or a weighted average.

The selector 234 selects the input smoothed signal Vf or the input video signal Vb according to the range decision signal FPJ, and outputs the output video signal Vd. More specifically, when the range decision signal FPJ is '1', the selector 234 selects the smoothed signal Vf, and outputs the smoothed signal Vf as the output video signal Vd. When the range decision signal FPJ is '0', the selector 234 selects the video signal Vb, and outputs the video signal Vb as the output video signal Vd.

As the output video signal Vd, the horizontal smoother 203 accordingly outputs the smoothed signal Vf in a continuous range of phases including the detected block phase, at least one phase preceding the detected block phase, and at least one phase following the detected block phase, and outputs the input video signal Vb at phases outside this range.

Figure 10E:
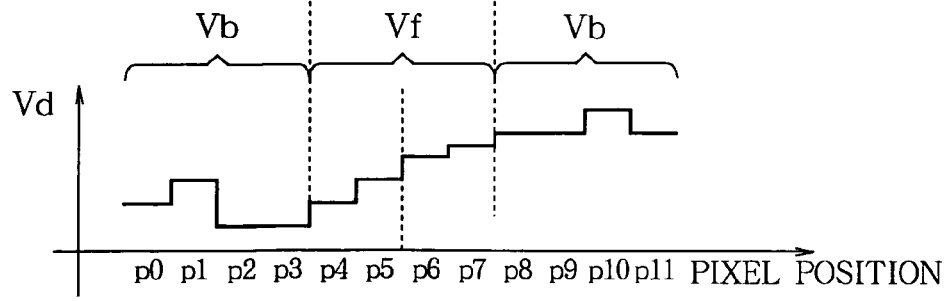

In the operation shown in FIGS. 10A to 10E, for example, since the range decision signal FPJ is '1' in pixel positions p4 to p7 as shown in FIG. 10B, the smoothed signal Vf shown in FIG. 10D is output as the output video signal Vd in these pixel positions, as shown in FIG. 10E, and since the range decision signal FPJ is '0' in pixel positions other than pixel positions p4 to p7, the input video signal Vb shown in FIG. 10C is output as the output video signal Vd in pixel positions other than pixel positions p4 to p7.

Because the block noise detector 100 detects edges by separately comparing each spatial difference with left-neighboring spatial differences and with right-neighboring spatial differences, outputs one detected block phase signal DBP for each horizontal synchronizing signal Hsync, and thereby detects block noise separately in each horizontal line as described above, the block noise-detector 100 has both reduced circuit size and improved accuracy.

The phased accumulator 102 in the block noise detector 100 includes eight counters 1230-1237, matching the horizontal block width of eight pixels in the description above. In general, if the horizontal block width is assumed or known to be N pixels, where N may be any integer greater than one, the block noise detector and block noise reducer include N counters (that operate in the same way as counters 1230-1237), and the phase number signals PNS and PMS take values from zero to N−1.

Second Embodiment

Figure 12:
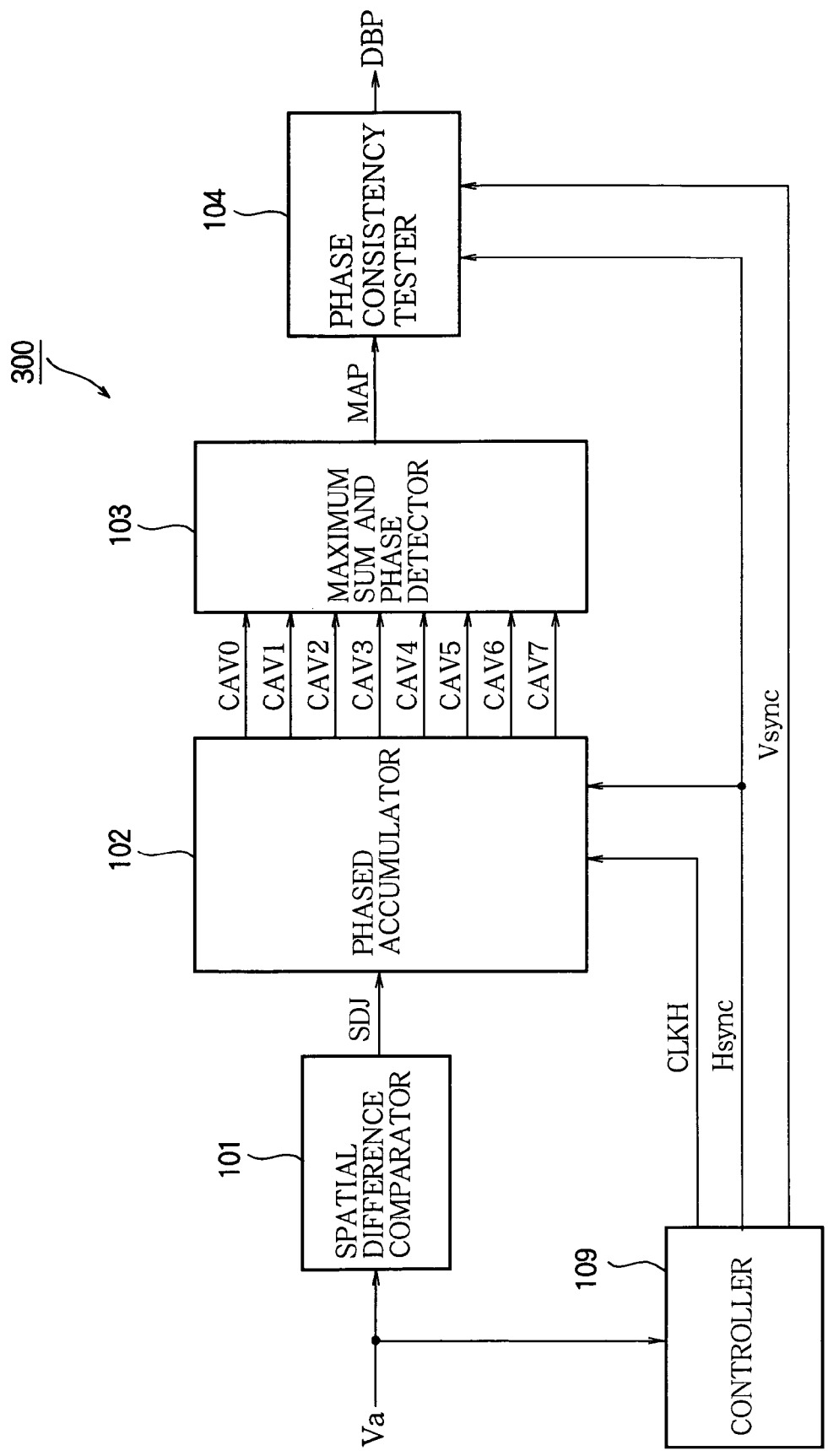
FIG. 12 is a block diagram of a block noise detector according to a second embodiment of the invention.

Referring to FIG. 12, the block noise detector 300 in the second embodiment differs from the block noise detector 100 in FIG. 1 in the first embodiment by adding a phase consistency tester 104 on the output side of the maximum sum and phase detector 103. The maximum sum and phase detector 103 supplies the maximum phase signal MAP to the phase consistency tester 104.

The controller 109 in the block noise detector 300 in FIG. 12 extracts the horizontal synchronizing signal Hsync and vertical synchronizing signal Vsync from the input video signal Va, and supplies Hsync and Vsync to the phase consistency tester 104.

The phase consistency tester 104 stores the maximum phase signal MAP for eight consecutive lines, compares the eight stored values, and outputs the maximum phase signal MAP as the detected block phase signal DBP if the eight MAP values are identical.

Figure 13:
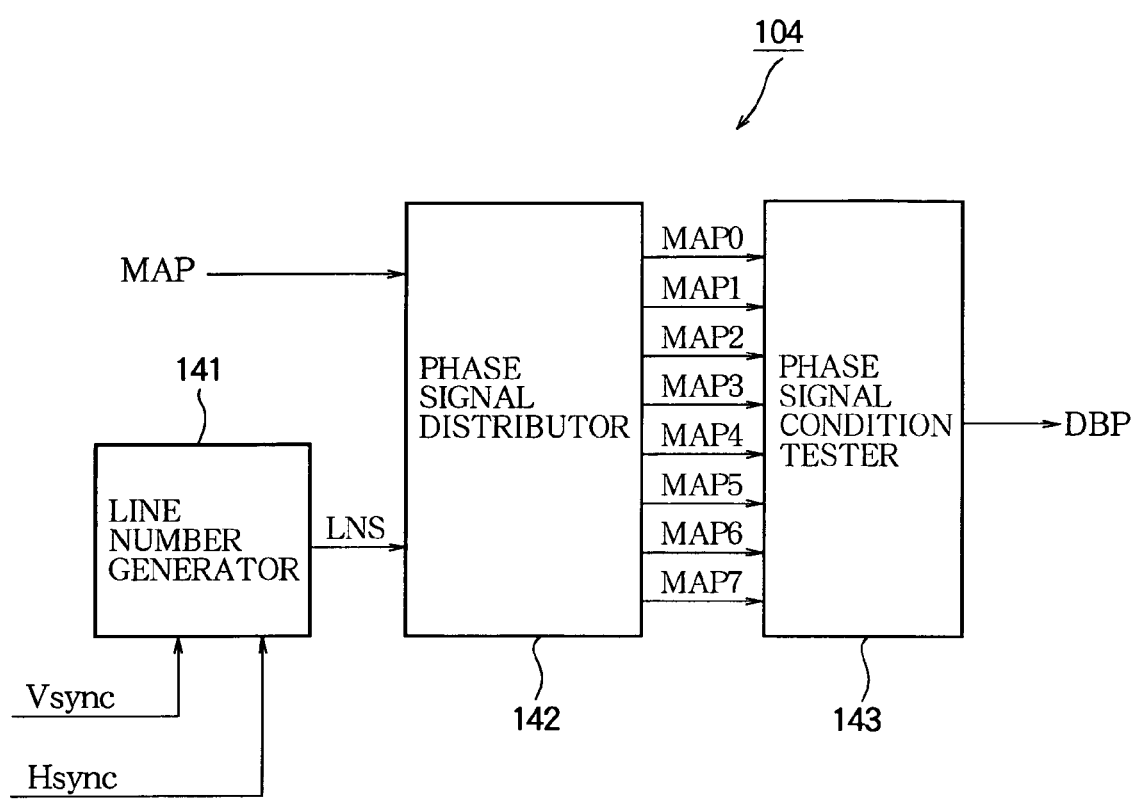
FIG. 13 is a block diagram of the phase consistency tester in the second embodiment.

An example of the internal structure of the phase consistency tester 104 is shown in FIG. 13. The phase consistency tester 104 comprises a line number generator 141, a phase signal distributor 142, and a phase signal condition tester 143.

The line number generator 141 operates in synchronization with the vertical synchronizing signal Vsync, counts lines by counting horizontal synchronizing signals Hsync modulo eight, and outputs a line number signal LNS with line values from PV0 to PV7 to the phase signal distributor 142 to identify the lines.

The phase signal distributor 142 supplies the input maximum phase signal MAP to the phase signal condition tester 143 as line-MAP values MAP0 to MAP7 according to the lines PV0 to PV7 indicated by the input line number signals LNS. More specifically, if the line number signal LNS indicates a certain line PVn, n being an integer from zero to seven ($0 \leq n \leq 7$), the phase signal distributor 142 outputs the maximum phase signal MAP received at line PVn as line-MAP value MAPn.

Figure 14A:
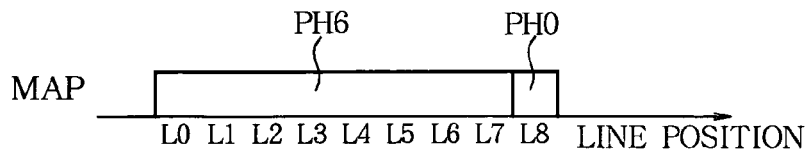
FIGS. 14A to 14K illustrate the operation of the phase consistency tester.
Figure 14B:
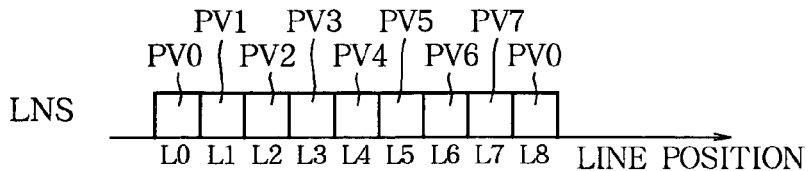
Figure 14C:
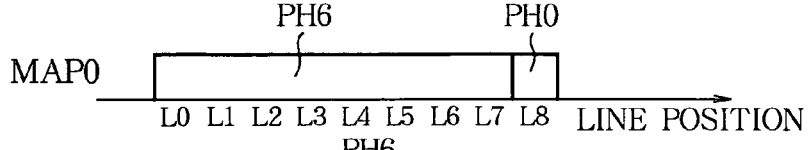
Figure 14D:
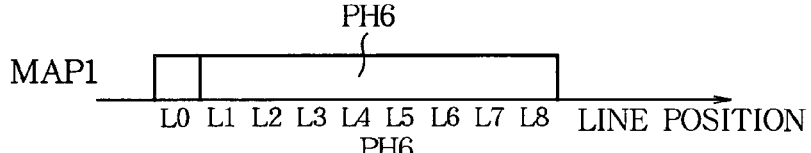
Figure 14E:
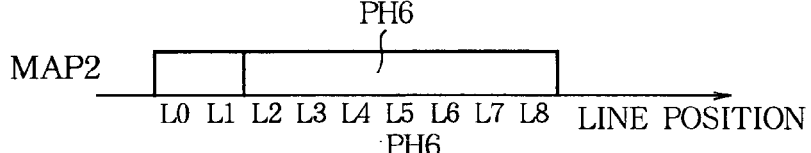
Figure 14F:
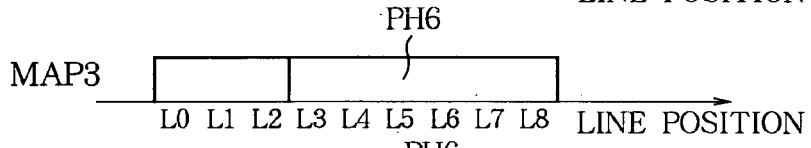
Figure 14G:
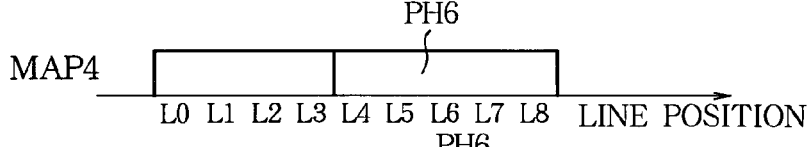
Figure 14H:
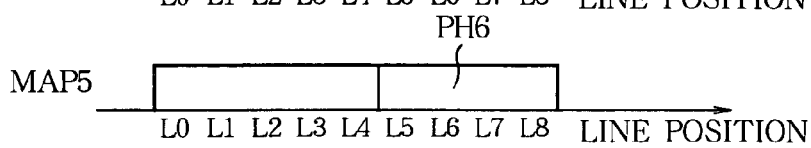
Figure 14I:
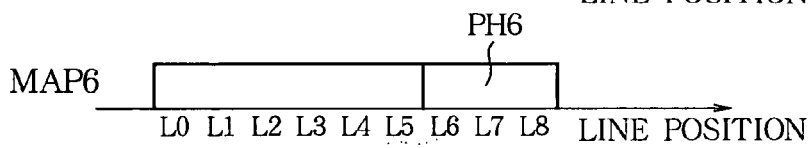
Figure 14J:
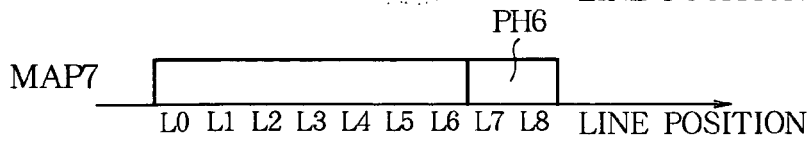
Figure 14K:
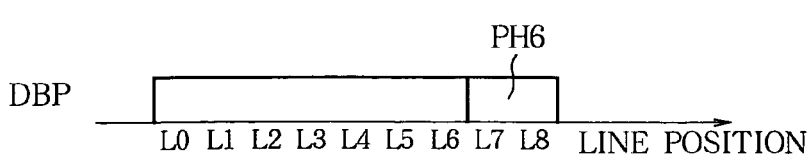

If, for example, the phase signal distributor 142 receives the maximum phase signal MAP as shown in FIG. 14A and the line number signal LNS as shown in FIG. 14B, then for line L0, since the maximum phase signal MAP is 'PH6' and the line number signal LNS indicates line PV0, the phase signal distributor 142 outputs a line-MAP value MAP0 of 'PH6' as shown in FIG. 14C.

The phase signal condition tester 143 compares the input values MAP0 to MAP7. If all eight line-MAP values MAP0 to MAP7 are identical, the phase signal condition tester 143 outputs a detected block phase signal DBP with a value equal to the identical line-MAP values MAP0 to MAP7.

In the operation shown in FIGS. 14A to 14K, for example, at line L7, since the line-MAP values MAP0 to MAP7 are identically 'PH6' for lines PV0 to PV7, the phase signal condition tester 143 outputs a detected block phase signal DBP with the value 'PH6'. The phase signal condition tester 143 continues to output the detected block phase signal DBP with this value ('PH6' in this example) either until the end of the video field or frame or until the line-MAP values MAP0 to MAP7 for lines PV0 to PV7 all have another identical value (other than 'PH6').

In the example shown in FIGS. 14A to 14K, since line-MAP value MAP0 becomes 'PH0' in the next line L8 after line L7, the condition that the maximum phase signal MAP must have identical line-MAP values MAP0 to MAP7 is no longer satisfied, but the phase signal condition tester 143 continues to output the detected block phase signal DBP with the value 'PH6' until the end of the video field, or until at some point the line-MAP values MAP0 to MAP7 all become identically equal to a value other than 'PH6'. If, for example, at some point the line-MAP values MAP0 to MAP7 of lines PV0 to PV7 are all 'PH2', the phase signal condition tester 143 then switches from output of 'PH6' to output of 'PH2' as the detected block phase signal DBP.

Figure 15:
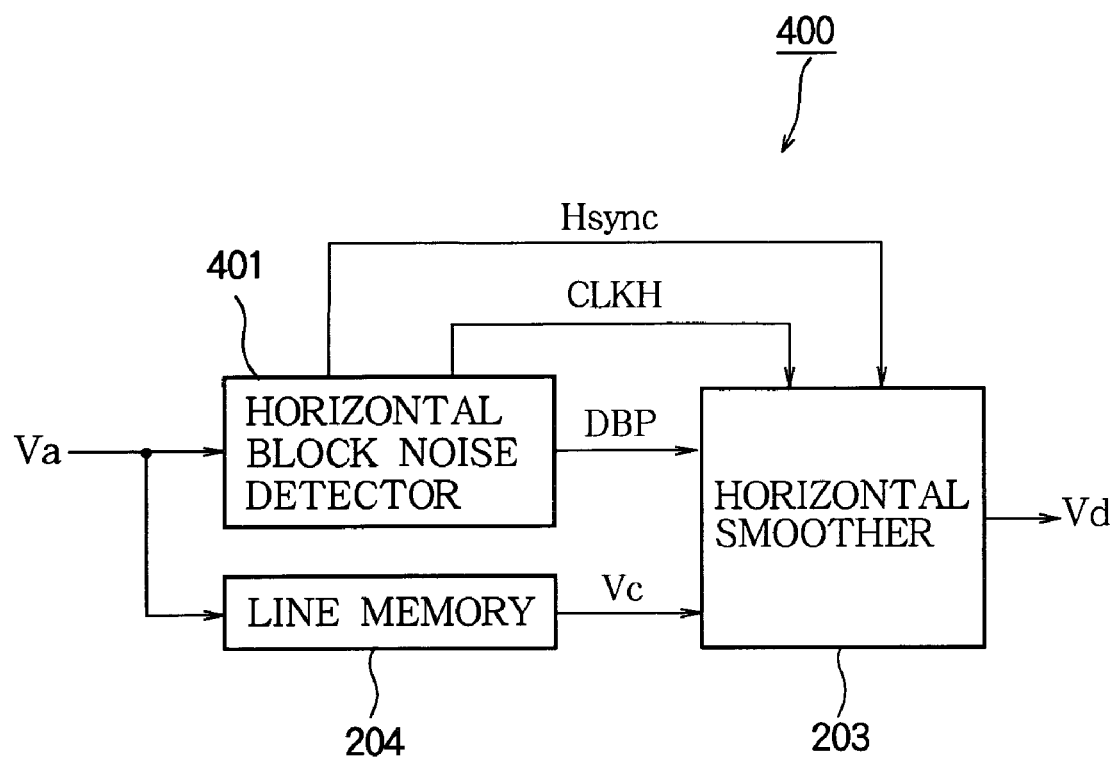
FIG. 15 is a block diagram of a block noise reducer including the block noise detector in the second embodiment.

Referring to FIG. 15, a block noise reducer 400 using the block noise detector 300 in the second embodiment comprises a horizontal block noise detector 401, a horizontal smoother 203, and a line memory 204. The horizontal smoother 203 has the same internal structure as the horizontal smoother 203 in FIG. 8, so a description will be omitted.

The horizontal block noise detector 401 has the same structure as the block noise detector 300 in FIG. 12. The horizontal block noise detector 401 receives the input video signal Va and outputs the detected block phase signal DBP to the horizontal smoother 203.

The line memory 204 holds the input video signal Va for eight lines, thereby delaying the video signal Va by eight lines, and outputs the delayed signal as an input video signal Vc to the horizontal smoother 203.

The operation of the horizontal smoother 203 in FIG. 15 differs from the operation of the horizontal smoother 203 in FIG. 8 only in that in FIG. 15, the horizontal smoother 203 receives a video signal Vc generated by delaying the video signal Va by eight lines, instead of a video signal Vb generated by delaying the video signal Va by one line. Since the phase consistency tester 104 in the horizontal block noise detector 401 generates a detected block phase signal DBP based on data for eight lines, to apply the information in the detected block phase signal DBP to all eight lines, the horizontal smoother 203 must receive the video signal Vc that the horizontal block noise detector 401 received eight lines previously.

Because the block noise detector 300 outputs the detected block phase signal DBP when the maximum phase signal MAP has identical line-MAP values MAP0 to MAP7 for eight consecutive lines, the block noise detector 300 can detect block noise with greater certainty than in the first embodiment.

The second embodiment is not restricted to requiring eight identical line-MAP values MAP0 to MAP7 as in the description above. The required number of consecutive line-MAP values may be any number equal to or greater than two. The more line-MAP values are used, the more effectively the block noise detector 300 can detect block noise, but the detection operation takes longer and requires more hardware, so the optimum number of required identical line-MAP values is a design choice to be made in consideration of speed, accuracy, and hardware size and cost.

Third Embodiment

Figure 16:
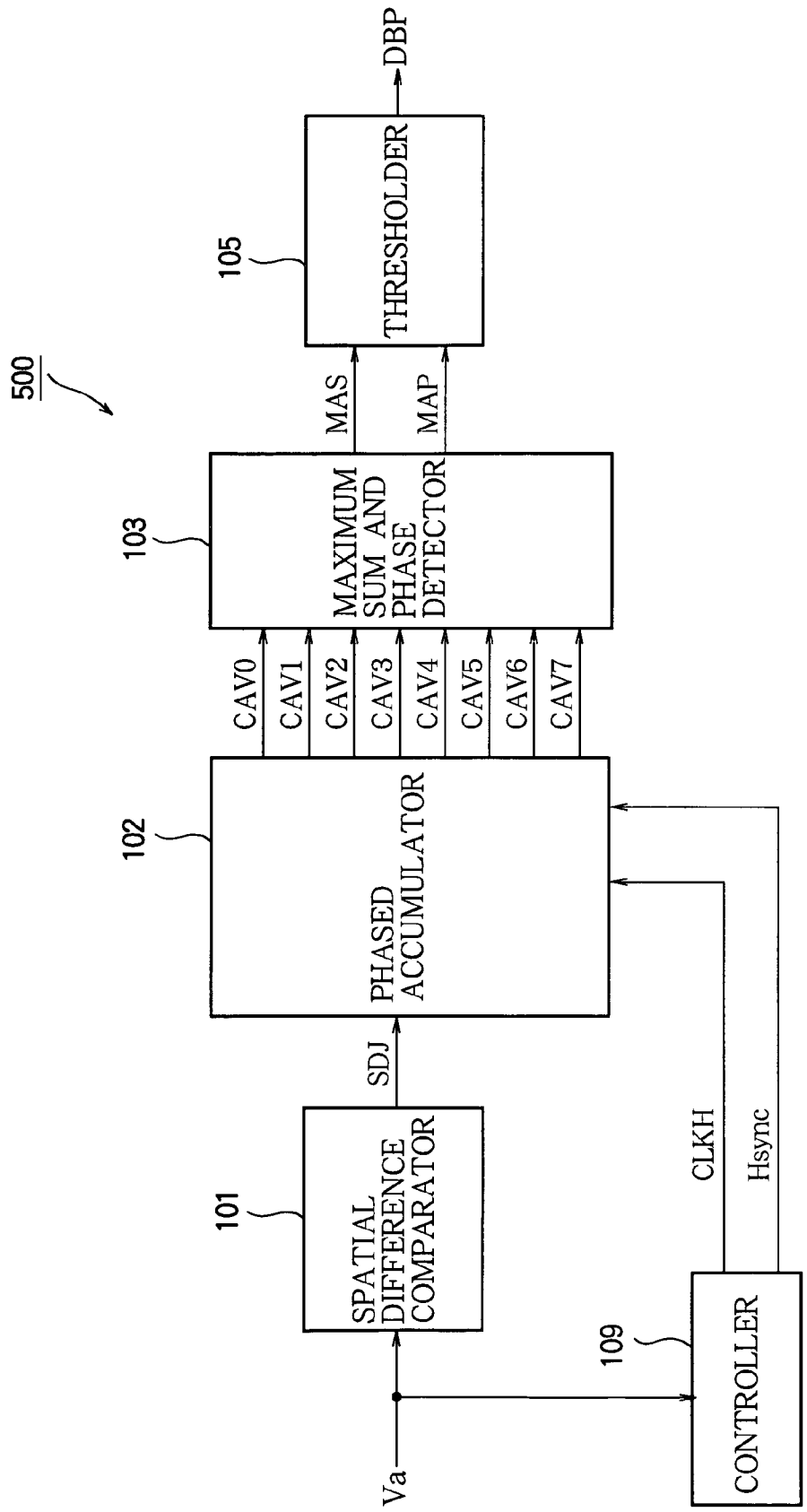
FIG. 16 is a block diagram of a block noise detector according to a third embodiment.

Referring to FIG. 16, the block noise detector 500 in the third embodiment differs from the block noise detector 100 in FIG. 1 in the first embodiment by adding a thresholder 105 on the output side of the maximum sum and phase detector 103. The maximum sum and phase detector 103 supplies the maximum value signal MAS and the maximum phase signal MAP to the thresholder 105.

The thresholder 105 compares the input maximum value signal MAS with a threshold value and outputs the maximum phase signal MAP as the detected block phase signal DBP, but outputs the detected block phase signal DBP only when the maximum value signal MAS is greater than the threshold value.

Because the block noise detector 500 outputs the detected block phase signal DBP only when the maximum value signal MAS is greater than the threshold value, as described above, the block noise detector 500 does not mistakenly detect a rectangle forming part of the image in a video field as block noise.

A block noise reducer may include the block noise detector 500 shown in FIG. 16, instead of the block noise detector 100 shown in FIG. 1, as the horizontal block noise detector 201 in FIG. 8.

Fourth Embodiment

Figure 17:
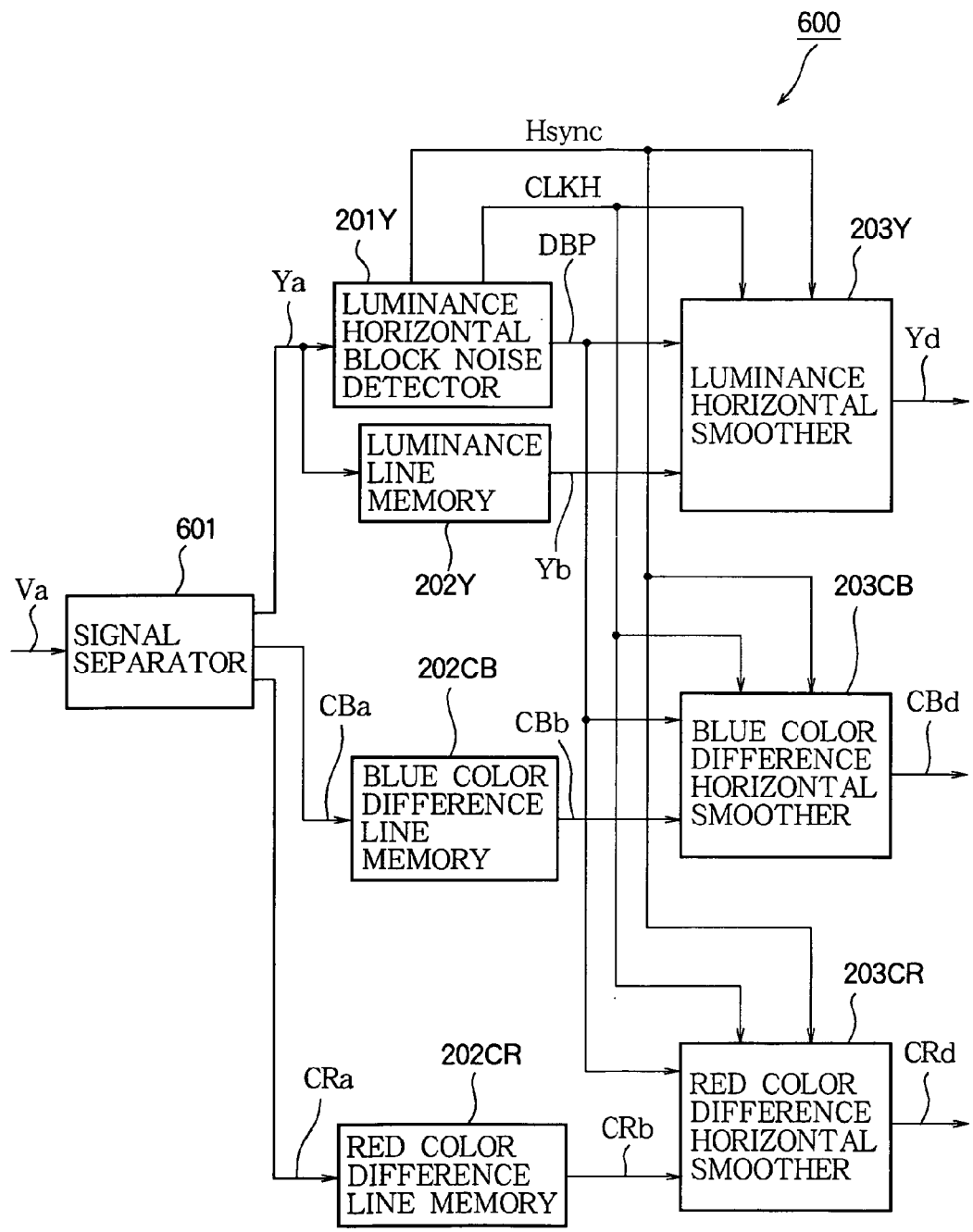
FIG. 17 is a block diagram of a block noise reducer according to a fourth embodiment.

Referring to FIG. 17, the block noise reducer 600 in the fourth embodiment comprises a signal separator 601, a luminance horizontal block noise detector 201Y, a luminance line memory 202Y, a blue color difference line memory 202CB, a red color difference line memory 202CR, a luminance horizontal smoother 203Y, a blue color difference horizontal smoother 203CB, and a red color difference horizontal smoother 203CR. The fourth embodiment is for use when the input video signal Va includes a luminance signal, a blue color difference signal, and a red color difference signal.

The signal separator 601 separates the input video signal Va into an input luminance signal Ya, an input blue color difference signal CBa, and an input red color difference signal CRa.

The luminance horizontal block noise detector 201Y has the same internal structure as the block noise detector 100 in FIG. 1, or alternatively, as the block noise detector 300 in FIG. 12 or the block noise detector 500 in FIG. 16. The luminance horizontal block noise detector 201Y receives the input luminance signal Ya, detects block noise in the input luminance signal Ya, and outputs the detected block phase signal DBP to the luminance horizontal smoother 203Y, the blue color difference horizontal smoother 203CB, and the red color difference horizontal smoother 203CR.

The luminance line memory 202Y is similar to the line memory 202 in FIG. 8, but receives the input luminance signal Ya instead of the input video signal Va, delays the input luminance signal Ya by one line, and outputs the delayed signal as an input luminance signal Yb to the luminance horizontal smoother 203Y.

The blue color difference line memory 202CB is also similar to the line memory 202 in FIG. 8, but receives the input blue color difference signal CBa instead of the input video signal Va, delays the input blue color difference signal CBa by one line, and outputs the delayed signal as an input blue color difference signal CBb to the blue color difference horizontal smoother 203CB.

The red color difference line memory 202CR is likewise similar to the line memory 202 in FIG. 8, but receives the input red color difference signal CRa instead of the input video signal Va, delays the input red color difference signal CRa by one line, and outputs the delayed signal as an input red color difference signal CRb to the red color difference horizontal smoother 203CR.

The luminance horizontal smoother 203Y has the same internal structure as the horizontal smoother 203 in FIG. 8 but receives the input luminance signal Yb instead of the input video signal Vb, smoothes the input luminance signal Yb in a first continuous range of phases including the phase identified by the detected block phase signal DBP in the current line, and outputs the resulting partially smoothed signal as an output luminance signal Yb.

The blue color difference horizontal smoother 203CB also has the same internal structure as the horizontal smoother 203 in FIG. 8, but receives the input blue color difference signal CBb instead of the input video signal Vb, smoothes the input blue color difference signal CBb in a second continuous range of phases including the phase identified by the detected block phase signal DBP in the current line, and outputs the resulting partially smoothed signal as an output blue color difference signal CBd.

The red color difference horizontal smoother 203CR likewise has the same internal structure as the horizontal smoother 203 in FIG. 8 but receives the input red color difference signal CRb instead of the input video signal Vb, smoothes the input red color difference signal CRb in the second continuous range of phases, and outputs the resulting partly smoothed signal as an output red color difference signal CRd.

The second continuous range may be identical to the first continuous range. Each range includes at least one phase preceding the phase identified by the detected block phase signal DBP, and at least one phase following the phase identified by the detected block phase signal DBP.

Because the block noise reducer 600 smoothes the red and blue color difference signal CRa, CBa as well as the luminance signal Ya, the block noise reducer 600 in the third embodiment can reduce block noise due to coding of the color difference signals, as well as reducing luminance block noise.

Fifth Embodiment

Figure 18:
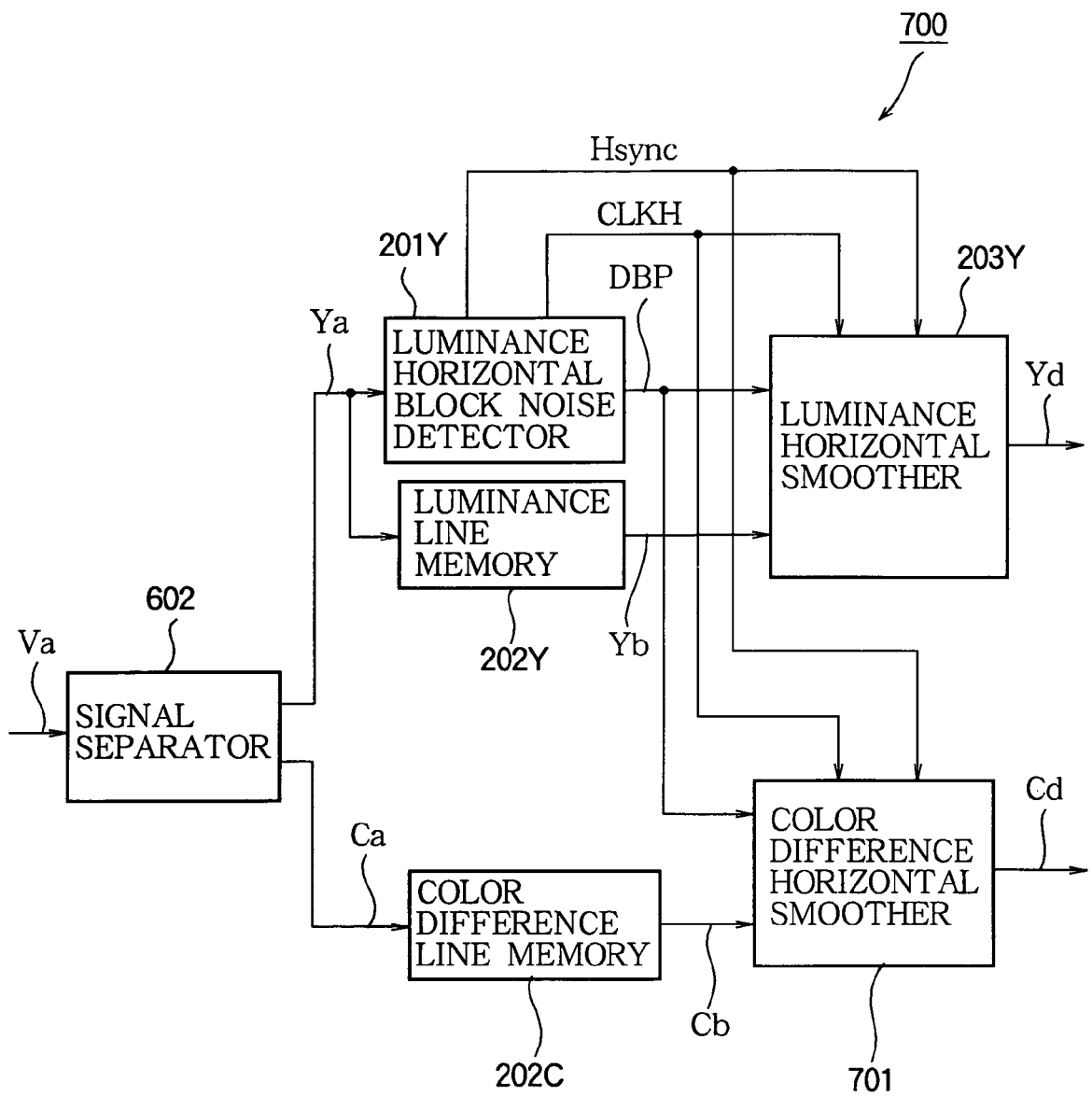
FIG. 18 is a block diagram of a block noise reducer according to a fifth embodiment.

Referring to FIG. 18, the block noise reducer 700 in the fifth embodiment comprises a signal separator 602, a luminance horizontal block noise detector 201Y, a luminance line memory 202Y, a color difference line memory 202C, a luminance horizontal smoother 203Y, and a color difference horizontal smoother 701. The fifth embodiment is for use when the input video signal Va includes a luminance signal and a single color difference signal. The single color difference signal is a string of data representing a blue color difference signal component and a red color difference signal component at alternate pixels. These color difference components may represent, for example, the difference between the luminance component and the blue or red component of the pixel, or they may simply represent the blue or red component (e.g., its difference from black). The luminance horizontal block noise detector 201Y, luminance line memory 202Y, and luminance horizontal smoother 203Y are the same as in FIG. 17, so a description will be omitted.

The signal separator 602 separates the input video signal Va into an input luminance signal Ya and an input color difference signal Ca.

The color difference line memory 202C is similar to the line memory 202 in FIG. 8 but receives the input color difference signal Ca instead of the input video signal Va, delays the input color difference signal Ca by one line, and outputs the delayed signal as an input color difference signal Cb to the color difference horizontal smoother 701.

The color difference horizontal smoother 701 smoothes the input color difference signal Cb in a continuous range of phases including the phase identified by the detected block phase signal DBP in the current line, at least one preceding phase, and at least one following phase, and outputs the smoothed signal as an output color difference signal Cd.

Figure 19:
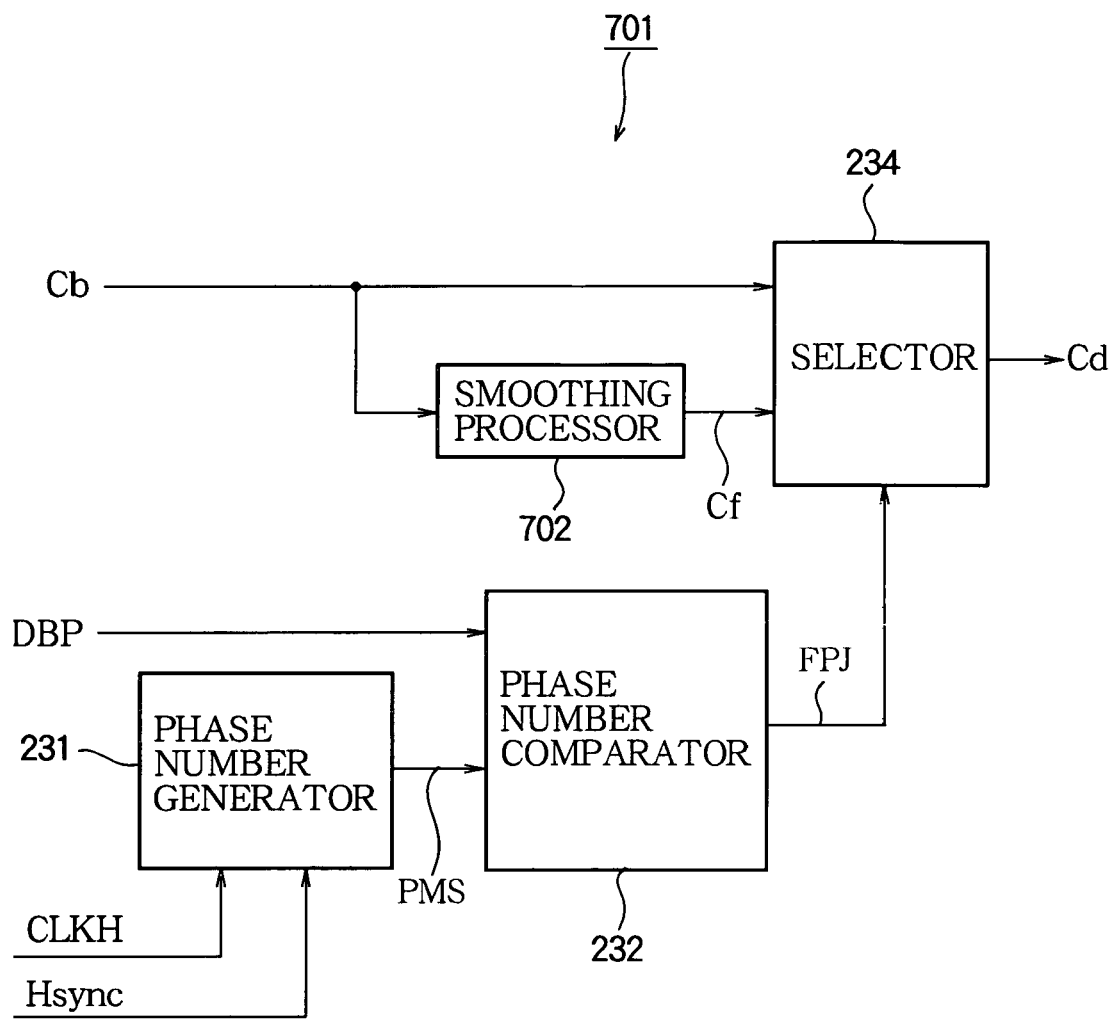
FIG. 19 is a block diagram of the color difference horizontal smoother in FIG. 18.

Referring to FIG. 19, the color difference horizontal smoother 701 in the block noise reducer 700 comprises a phase number generator 231, a phase number comparator 232, a smoothing processor 702, and a selector 234. The phase number generator 231, phase number comparator 232, and selector 234 have the same functions as in the first embodiment (FIG. 9), except that the selector 234 operates on the color difference component of the video signal. Since the operation performed is the same as in the first embodiment, a detailed description will be omitted.

The smoothing processor 702 smoothes the input color difference signal Cb and outputs the smoothed signal as a smoothed signal Cf to the selector 234. Like input color difference signal Ca, input color difference signal Cb represents blue data and red data at alternate pixels, so the smoothing processor 702 is structured to average the red and blue data separately.

An example of the internal structure of the smoothing processor 702 in the color difference horizontal smoother 701 is shown in FIG. 20. The smoothing processor 702 in this example includes delay circuits 240g, 240h, 240i, and 240j and a color difference signal averager 703. The delay circuits 240g, 240h, 240i, and 240j have the same internal structure as in FIG. 11. The delay circuit 240g receives the input color difference signal Cb, instead of the input video signal Vb, and outputs an input color difference signal Cg with a one-pixel delay; delay circuit 240h outputs an input color difference signal Ch with a two-pixel delay; delay circuit 240i outputs an input color difference signal Ci with a three-pixel delay; and delay circuit 240j outputs an input color difference signal Cj with a four-pixel delay.

The color difference signal averager 703 calculates the average value of input color difference signals Cb, the two-pixel delayed input color difference signal Ch, and the four-pixel delayed input color difference signal Cj, and outputs the average value as the smoothed signal Cf. The average value may be a simple average or a weighted average.

The luminance horizontal smoother 203Y and the color difference horizontal smoother 701 in this example operate as shown in FIGS. 21A to 21D.

An input luminance signal Yb with values Y0, Y1, Y2, . . . for pixels p0, p1, p2, . . . is shown in FIG. 21A. An input color difference signal Cb with values CB0, CB1, CB2, . . . for pixels p0, p1, p2, . . . is shown in FIG. 21C.

When the luminance horizontal smoother 203Y receives the luminance value Y4 for pixel p4 as shown in FIG. 21A, the luminance horizontal smoother 203Y outputs the average luminance value Yave2 of the luminance values Y0 to Y4 of pixel p2 and nearby pixels p0, p1, p3, and p4 as the smoothed signal Yf as shown in FIG. 21B.

When the color difference horizontal smoother 701 receives the input color difference signal Cb with the blue data CB4 of pixel p4 as shown in FIG. 21C, it outputs the average value CBave2 of the blue data CB0, CB2, and CB4 of pixel p2 and nearby pixels p0 and p4 as the smoothed signal Cf as shown in FIG. 21D. When the smoothing processor 702 receives the input color difference signal Cb with the red data CR5 of pixel p5 as shown in FIG. 21C, the color difference horizontal smoother 701 outputs the average value Crave3 of the red data CR1, CR3, and CR5 of pixel p3 and nearby pixels p1 and p5 as the smoothed signal Cf, as also shown in FIG. 21D.

Accordingly, the color difference signal averager 703 outputs average blue data values and average red data values for alternate pixels.

Because the input video signal Va smoothed by the block noise reducer 700 includes only one color difference signal instead of two, the block noise reducer 700 needs only the luminance horizontal smoother 203Y and color difference horizontal smoother 701, instead of the luminance horizontal smoother 203Y, blue color difference horizontal smoother 203CB, and red color difference horizontal smoother 203CR required in the fourth embodiment, so the circuit size of the block noise reducer 700 is substantially two-thirds the circuit size of the block noise reducer 600 in the fourth embodiment.

Sixth Embodiment

Figure 22:
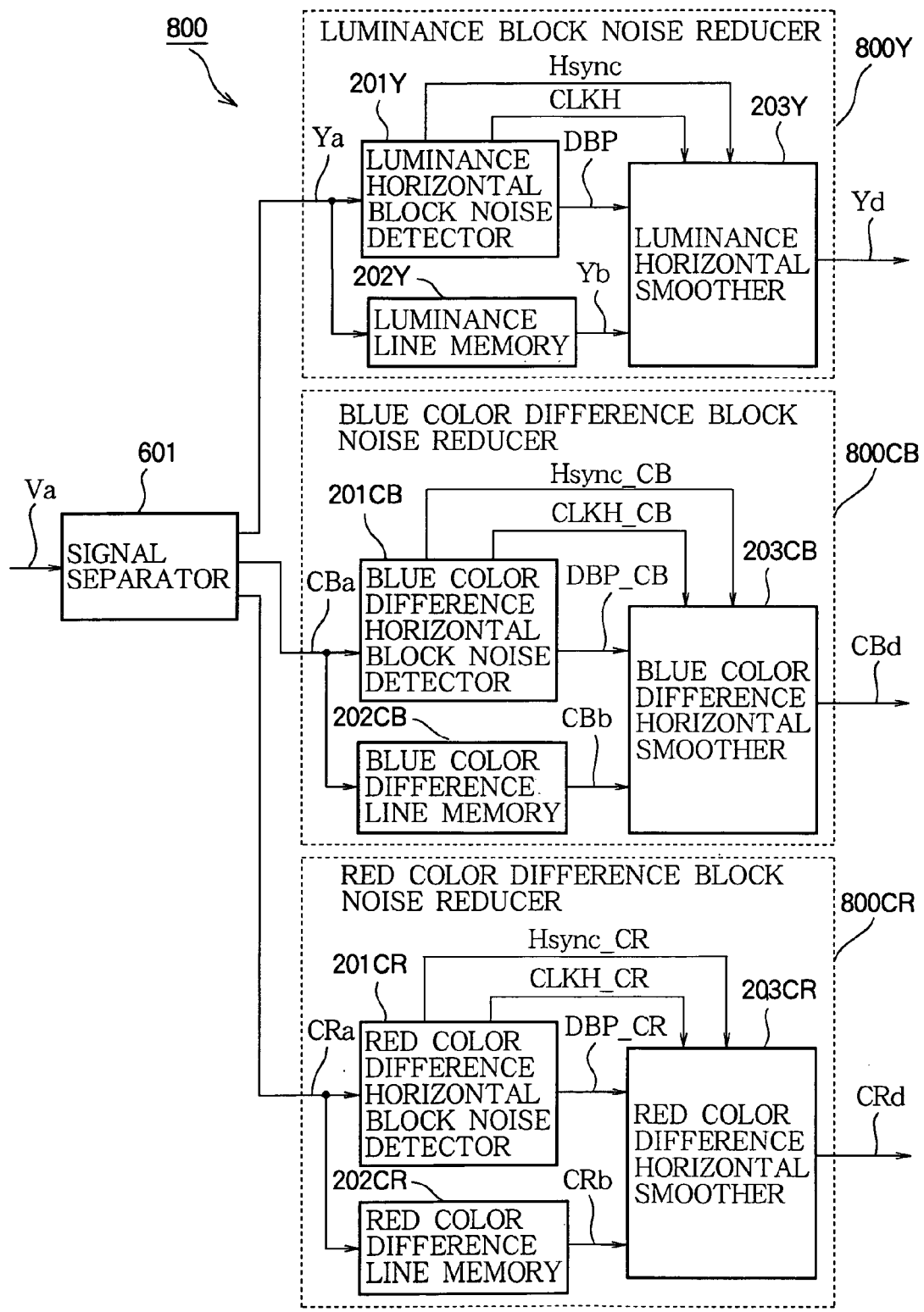
FIG. 22 is a block diagram of a block noise reducer according to a sixth embodiment of the invention.

Referring to FIG. 22, the block noise reducer 800 in the sixth embodiment comprises a signal separator 601, a luminance block noise reducer 800Y, a blue color difference block noise reducer 800CB, and a red color difference block noise reducer 800CR.

The signal separator 601 separates the input video signal Va into an input luminance signal Ya, an input blue color difference signal CBa, and an input red color difference signal CRa.

The luminance block noise reducer 800Y comprises a luminance horizontal block noise detector 201Y, a luminance line memory 202Y, and a luminance horizontal smoother 203Y.

The blue color difference block noise reducer 800CB comprises a blue color difference horizontal block noise detector 201CB, a blue color difference line memory 202CB, and a blue color difference horizontal smoother 203CB.

The red color difference block noise reducer 800CR comprises a red color difference horizontal block noise detector 201CR, a red color difference line memory 202CR, and a red color difference horizontal smoother 203CR.

Like the fourth embodiment, the sixth embodiment is for use when the input video signal Va includes a luminance signal, a blue color difference signal, and a red color difference signal. The line memories 202Y, 202CB, and 202CR and luminance horizontal block noise detector 201Y are the same as in the fourth embodiment (FIG. 17), except that the luminance horizontal block noise detector 201Y, which detects block noise in the input luminance signal Ya, outputs the detected block phase signal DBP, together with the horizontal synchronizing signal Hsync and a luminance pixel clock signal CLKH, only to the luminance horizontal smoother 203Y.

The blue color difference horizontal block noise detector 201CB has the same internal structure as the luminance horizontal block noise detector 201Y, but receives the input blue color difference signal CBa, detects block noise in the input blue color difference signal CBa, and outputs a detected blue color difference block phase signal DBP_CB, together with a blue color difference horizontal synchronizing signal Hsync_CB and a blue color difference pixel clock signal CLKH_CB, to the blue color difference horizontal smoother 203CB.

The red color difference horizontal block noise detector 201CR also has the same internal structure as the luminance horizontal block noise detector 201Y, but receives the input red color difference signal CRa, detects block noise in the input red color difference signal CRa, and outputs a detected red color difference block phase signal DBP_CR, together with a red color difference horizontal synchronizing signal Hsync_CR and a red color difference pixel clock signal CLKH_CR, to the red color difference horizontal smoother 203CR.

The luminance horizontal smoother 203Y, blue color difference horizontal smoother 203CB, and red color difference horizontal smoother 203CR are the same as in the fourth embodiment (FIG. 17), except that the blue color difference horizontal smoother 203CB operates on the blue color difference horizontal synchronizing signal Hsync_CB, blue color difference pixel clock CLKH_CB, and blue color difference detected block phase signal DBP_CB output from the blue color difference horizontal block noise detector 201CB, and the red color difference horizontal smoother 203CR operates on the red color difference horizontal synchronizing signal Hsync_CR, red color difference pixel clock CLKH_CR, and detected red color difference block phase signal DBP_CR output from the red color difference horizontal block noise detector 201CR. The output luminance signal Yd, output blue color difference signal CBd, and output red color difference signal CRd may accordingly be smoothed in different ranges. This enables accurate block noise reduction to be performed for the color difference signals even if their block boundaries do not coincide with the luminance block boundaries (even if the color difference blocks are twice as wide as the luminance blocks, for example), and even if the block boundaries of the red color difference signal differ from the block boundaries of the blue color difference signal.

Because the block noise reducer 800 in the sixth embodiment has separate horizontal block noise detectors 201Y, 201CB, 201CR for the input luminance signal Ya, color difference signal CBa, and red color difference signal CRa, when the input video signal Va has a constant luminance level, for example, the block noise reducer 800 can still reduce block noise that may occur in the color difference signals CBa, CRa. For example, the block noise reducer 800 can reduce block noise in blue sky and sunset images.

The present invention is not limited to the preceding embodiments; those skilled in the art will recognize that further variations are possible within the scope defined in the appended claims.

What is claimed is:

1. A block noise detector that receives an input video signal including pixel values and a horizontal synchronizing signal, and detects block boundaries due to block noise with an assumed block width, comprising:
    a spatial difference comparator for calculating spatial differences by calculating differences between the pixel values of mutually adjacent pixels in the input video signal, detecting edges by comparing the calculated spatial differences, and outputting a decision signal indicating, for each calculated spatial difference, whether an edge is detected at a corresponding position;
    a phased accumulator including a plurality of counters for cyclically receiving the decision signal, counting edges detected at different phases in the receiving cycle, and outputting count values at a timing synchronized with the horizontal synchronizing signal; and
    a maximum sum and phase detector for outputting a maximum value signal having a maximum value among the count values output by the counters at said timing, and a maximum phase signal indicating a phase at which the maximum value occurs; wherein
    the block noise detector outputs a detected block phase signal indicating a detected block phase at which block boundaries occur, based on the maximum phase signal.

2. The block noise detector of claim 1, wherein the spatial difference comparator compares each spatial difference separately with a predetermined number of left-neighboring spatial differences and with a predetermined number of right-neighboring spatial differences, and detects an edge if a predetermined condition is satisfied with respect to either the left-neighboring spatial differences or the right-neighboring spatial differences.

3. The block noise detector of claim 2, wherein the predetermined condition is that the spatial difference be greater than all of the left-neighboring spatial differences, or greater than all of the right-neighboring spatial differences.

4. The block noise detector of claim 1, wherein the maximum phase signal is output as the detected block phase signal.

5. The block noise detector of claim 1, wherein the assumed block width is N pixels and the phased accumulator includes N counters, N being a positive integer.

6. The block noise detector of claim 5, wherein N is eight.

7. The block noise detector of claim 1, further comprising a phase consistency tester including a phase signal condition tester for receiving and comparing the maximum phase signal output by the maximum sum and phase detector for a plurality of consecutive horizontal lines, and outputting the detected block phase signal only if the maximum phase signal has identical values for all of the consecutive horizontal lines.

8. The block noise detector of claim 1, further comprising a thresholder for comparing the maximum value signal with a threshold value and outputting the maximum phase signal as the detected block phase signal, but outputting the detected block phase signal only when the maximum value signal is greater than the threshold value.

9. A block noise reducer including the block noise detector of claim 1 and a horizontal smoother, the horizontal smoother comprising:
- a smoothing processor for smoothing the input video signal to generate a smoothed signal; and
- a selector for selecting the input video signal and the smoothed signal for output as an output video signal, the smoothed signal being selected in a predetermined continuous range of phases including the detected block phase, at least one phase preceding the detected block phase, and at least one phase following the detected block phase, the input video signal being selected for phases outside the predetermined continuous range.

10. A block noise reducer comprising the block noise detector of claim 1, a luminance horizontal smoother, a blue color difference horizontal smoother, and a red color difference horizontal smoother, wherein:
- the input video signal includes an input luminance signal, an input blue color difference signal, and an input red color difference signal;
- the block noise detector outputs the detected block phase signal according to the input luminance signal;
- the luminance horizontal smoother includes a smoothing processor for smoothing the input luminance signal to generate a smoothed luminance signal, and a selector for outputting the smoothed luminance signal as an output luminance signal in a first continuous range of phases including the detected block phase, at least one phase preceding the detected block phase, and at least one phase following the detected block phase, and outputting the input luminance signal as the output luminance signal for phases outside the first continuous range;
- the blue color difference horizontal smoother includes a smoothing processor for smoothing the input blue color difference signal to generate a smoothed blue color difference signal, and a selector for outputting the smoothed blue color difference signal as an output blue color difference signal in a second continuous range of phases including the detected block phase, at least one phase preceding the detected block phase, and at least one phase following the detected block phase, and outputting the input blue color difference signal as the output blue color difference signal for phases outside the second continuous range; and
- the red color difference horizontal smoother includes a smoothing processor for smoothing the input red color difference signal to generate a smoothed red color difference signal, and a selector for outputting the smoothed red color difference signal as an output red color difference signal in the second continuous range of phases, and outputting the input red color difference signal as the output red color difference signal for phases outside the second continuous range.

11. A block noise reducer comprising the block noise detector of claim 1, a luminance horizontal smoother, and a color difference horizontal smoother, wherein:
- the input video signal includes an input luminance signal and an input color difference signal;
- the block noise detector detects block noise according to the input luminance signal and outputs the detected block phase signal;
- the luminance horizontal smoother includes a smoothing processor for smoothing the input luminance signal to generate a smoothed luminance signal, and a selector for outputting the smoothed luminance signal as an output luminance signal in a first continuous range of phases including the detected block phase, at least one phase preceding the detected block phase, and at least one phase following the detected block phase, and outputting the input luminance signal as the output luminance signal for phases outside the first continuous range; and
- the color difference horizontal smoother includes a smoothing processor for smoothing the input color difference signal to generate a smoothed color difference signal, and a selector for outputting the smoothed color difference signal as an output color difference signal in a second continuous range of phases including the detected block phase, at least one phase preceding the detected block phase, and at least one phase following the detected block phase, and outputting the input color difference signal as the output color difference signal for phases outside the second continuous range.

12. A block noise reducer comprising a luminance block noise reducer, a blue color difference block noise reducer, and a red color difference block noise reducer, the luminance block noise reducer, the blue color difference block noise reducer, and the red color difference block noise reducer each including the block noise detector of claim 1 and a horizontal smoother, wherein:
- the input video signal includes an input luminance signal, an input blue color difference signal, and an input red color difference signal;
- the block noise detector in the luminance block noise reducer receives the input luminance signal and outputs a first detected block phase signal indicating a detected luminance block phase;
- the horizontal smoother in the luminance block noise reducer includes a smoothing processor for smoothing the input luminance signal and outputting the smoothed luminance signal, and a selector for outputting the smoothed luminance output signal as an output luminance signal in a first continuous range of phases including the detected block phase, at least one phase preceding the detected block phase, and at least one phase following the detected block phase, and outputting the input luminance signal as the output luminance signal at phases outside the first continuous range;
- the block noise detector in the blue color difference block noise reducer receives the input blue color difference signal and outputs a second detected block phase signal indicating a detected blue color difference block phase;
- the horizontal smoother in the blue color difference block noise reducer includes a smoothing processor for smoothing the input blue color difference signal to generate a smoothed blue color difference signal, and a selector for outputting the smoothed blue color difference signal as a blue color difference output signal in a second continuous range of phases including the detected blue color difference block phase, at least one phase preceding the detected blue color difference block phase, and at least one phase following the detected blue color difference block phase, and outputting the input blue color difference signal as the output blue color difference signal for phases outside the second continuous range;
- the block noise detector in the red color difference block noise reducer receives the input red color difference signal and outputs a third detected block phase signal indicating a detected red color difference block phase; and the horizontal smoother in the red color difference block noise reducer includes a smoothing processor for smoothing the input red color difference signal to generate a smoothed red color difference signal, and a selector for outputting the smoothed red color difference signal as a red color difference output signal in a third continuous range of phases including the detected red color difference block phase, at least one phase preceding the detected red color difference block phase, and at least one phase following the detected red color difference block phase, and outputting the input red color difference signal as the output red color difference signal for phases outside than the third continuous range.

13. A method of detecting block noise in an input video signal including pixel values and a horizontal synchronizing signal by detecting block boundaries, the method comprising:

calculating differences between the values of adjacent pixels in the input video signal and outputting the calculated differences as spatial differences;

detecting edges by comparing the calculated spatial differences and outputting a decision signal indicating, for each calculated spatial difference, whether an edge is detected at a corresponding position;

receiving the decision signal cyclically, counting edges detected at different phases in the receiving cycle, and outputting resulting count values at a timing synchronized with the horizontal synchronizing signal;

outputting a maximum value signal having a maximum value among the count values output at said timing, and a maximum phase signal indicating a phase at which the maximum value occurs; and outputting a detected block phase signal indicating a phase at which the block boundaries occur, based on the maximum phase signal.

14. The method of claim 13, wherein detecting edges further comprises:

comparing each spatial difference separately with a predetermined number of left-neighboring spatial differences and with a predetermined number of right-neighboring spatial differences; and detecting an edge if a predetermined condition is satisfied with respect to either the left-neighboring spatial differences or the right-neighboring spatial differences.

15. The method of claim 14, wherein the predetermined condition is that the spatial difference be greater than all of the left-neighboring spatial differences, or greater than all of the right-neighboring spatial differences.

16. The method of claim 13, further comprising receiving and comparing the maximum phase signal output for a plurality of consecutive horizontal lines, wherein the detected block phase signal is output only if the maximum phase signal has identical values for all of the consecutive horizontal lines.

17. The method of claim 13, further comprising comparing the maximum value signal with a threshold value, wherein the maximum phase signal is output as the detected block phase signal but the detected block phase signal is output only when the maximum value signal is greater than the threshold value.

18. A method of reducing block noise, comprising:

detecting block noise by the method of claim 13;

smoothing the input video signal to generate a smoothed signal;

outputting the smoothed signal as an output video signal in a predetermined continuous range of phases including the detected block phase, at least one phase preceding the detected block phase, and at least one phase following the detected block phase; and outputting the input video signal as the output video signal for phases outside the predetermined continuous range.

* * * * *